(12) United States Patent
Howard et al.

(10) Patent No.: US 6,711,691 B1
(45) Date of Patent: Mar. 23, 2004

(54) POWER MANAGEMENT FOR COMPUTER SYSTEMS

(75) Inventors: Brian D. Howard, Portola Valley, CA (US); Michael F. Culbert, San Jose, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/567,201

(22) Filed: May 8, 2000

Related U.S. Application Data

(60) Provisional application No. 60/133,918, filed on May 13, 1999.

(51) Int. Cl.[7] .................................................. G06F 1/32
(52) U.S. Cl. ........................ 713/300; 713/320; 713/322
(58) Field of Search ................................ 713/300, 320, 713/322, 323, 324

(56) References Cited

U.S. PATENT DOCUMENTS

| | | | | |
|---|---|---|---|---|
| 5,167,024 A | | 11/1992 | Smith et al. | |
| 5,239,652 A | | 8/1993 | Seibert et al. | |
| 5,254,928 A | | 10/1993 | Young et al. | |
| 5,396,635 A | | 3/1995 | Fung | |
| 5,483,656 A | | 1/1996 | Oprescu et al. | |
| 5,557,777 A | | 9/1996 | Culbert | |
| 5,590,061 A | | 12/1996 | Hollowell, II et al. | |
| 5,600,841 A | | 2/1997 | Culbert | |
| 5,632,037 A | * | 5/1997 | Maher et al. | 713/322 |
| 5,708,816 A | | 1/1998 | Culbert | |
| 5,710,929 A | | 1/1998 | Fung | |
| 5,724,591 A | * | 3/1998 | Hara et al. | 713/322 |
| 5,737,615 A | * | 4/1998 | Tetrick | 713/324 |
| 5,799,198 A | | 8/1998 | Fung | |
| 5,809,314 A | * | 9/1998 | Carmean et al. | 713/322 |
| 5,812,796 A | | 9/1998 | Broedner et al. | |
| 5,892,959 A | | 4/1999 | Fung | |
| 6,105,097 A | | 8/2000 | Larky et al. | |
| 6,119,194 A | | 9/2000 | Miranda et al. | |
| 6,141,762 A | * | 10/2000 | Nicol et al. | 713/300 |
| 6,230,277 B1 | | 5/2001 | Nakaoka et al. | |
| 6,272,644 B1 | | 8/2001 | Urade et al. | |
| 6,308,278 B1 | | 10/2001 | Khouli et al. | |
| 6,460,143 B1 | * | 10/2002 | Howard et al. | 713/323 |

OTHER PUBLICATIONS

"Universal Serial Bus Specification", Revision 1.0, Jan. 15, 1996.

* cited by examiner

Primary Examiner—Dennis M. Butler
(74) Attorney, Agent, or Firm—Beyer Weaver & Thomas LLP

(57) ABSTRACT

Power management approaches for computer systems having one or more processors are disclosed. One power management approach provides hierarchical power management. The hierarchical nature of the power management provided by the invention has various levels of power management such that power consumption of the computer system is dependent upon the amount of work placed on the processing resources of the computer system. Another power management approach pertains to deterministic handshaking provided between a power manager and one or more controller units. The deterministic handshaking provides for more reliable and controllable transitions between power management states which have associated power management taking place in the controller units. The power management approaches are suitable for use with a single-processor computer system or a multi-processor computer system.

18 Claims, 22 Drawing Sheets

POWER MANAGEMENT FOR COMPUTER SYSTEMS

CROSS-REFERENCE TO RELATED APPLICATION

This application claims the benefit of U.S. Provisional Application No. 60/133,918, filed May 13, 1999, and entitled "POWER MANAGEMENT FOR COMPUTER SYSTEMS", the content of which is hereby incorporated by reference.

BACKGROUND OF THE INVENTION

1. Field of the Invention

The present invention relates to computer systems and, more particularly, to power management for computer systems.

2. Description of the Related Art

Computer systems include electrical components that consume power when is active. These electrical components include processors, controllers, buses, and various subsystems. Limited power management has been performed to reduce the power consumption of these electrical components. Often, with portable computers where power consumption is a major concern, the portable computers can enter a sleep mode in which the processor is slowed or stopped and in which the controllers, buses and various subsystems are also shutdown. The sleep mode thus provides a state which the portable computer is able to enter to conserve power when processing resources are not needed. In the sleep mode, processors, controllers and subsystems are able to be shutdown. Typically little power management is offered with desktop computers.

Although there are various disadvantages of conventional power management, one disadvantage is that the power management is primarily processor power management and not system level. As a result, the overall power management is not very efficient in reducing power consumption. Typically, many electrical components that consume significant amounts of power are either not power managed or crudely power managed to have only an on state (i.e., active) and an off state (i.e., shutdown). Also, in the case of desktop computers, conventional power management has been even less efficient.

Still further, conventional power management for multi-processor computer systems has not been efficient. Hence, large amounts of power are consumed by these multi-processor computer systems even when there is no activity.

Thus, there is a need for improved power management in computer systems.

SUMMARY OF THE INVENTION

Broadly speaking, the invention relates to power management for computer systems having one or more processors. One aspect of the invention pertains to providing hierarchical power management. The hierarchical nature of the power management provided by the invention has various levels of power management such that power consumption of the computer system is dependent upon the amount of work placed on the processing resources of the computer system. Another aspect lie of the invention pertains to deterministic handshaking provided between a power manager and one or more controller units. The deterministic handshaking provides for more reliable and controllable transitions between power management states which have associated power management taking place in the controller units. The invention is suitable for use with a single-processor computer system or a multi processor computer system.

The invention can be implemented in numerous ways, including as a computer system, an apparatus, a method, and a computer readable medium. Several embodiments of the invention are discussed below.

As a power management method for a multi-processor computer system having a plurality of processors, one embodiment of the invention includes: monitoring workload on the multi-processor computer system; and, placing the multi-processor computer system in one of a plurality of predetermined power management states based on the workload.

As a method for managing power consumption of a multi-processor computer system having a plurality of processors, one embodiment of the invention includes: determining a processing workload for the multi-processor computer system; awakening one or more of the processors from an inactive mode to an active mode when the processing workload is heavy; and transitioning one or more of the processors from the active mode to the inactive mode when the processing workload is light. The power consumption of the multi-processor computer system is managed such that those of the processors that are not needed to process the processing workload are transitioned into the inactive mode to conserve power, yet one or more of the processors can awaken from the inactive mode to the active mode to provide additional processing capabilities as needed to handle the processing workload.

As a method for providing deterministic state changes within a computer system having a plurality of processors, a bus controller and a power manager, one embodiment of the invention includes: determining when a lower power state of the multi-processor computer system should be entered to reduce power consumption, and entering the lower power state. The lower power state is entered by performing the following operations: receiving at the bus controller a state change request from the power manager; initiating a state change sequence at the bus controller upon receiving the state change request; and notifying the power manager when the bus controller has completed the state change sequence.

As a computer system, one embodiment of the invention includes: at least one processor, the processor executes operations in accordance with a processor clock; a bus controller operatively connected to the processor, the bus controller controls bus activity on a bus; and a power manager operatively connected to the processor and the bus controller, the power manager controls the processor clock and shutdown of the bus controller, and the power manager provides a first handshaking between the power manager and the bus controller to provide deterministic mode changes for the computer system so as to manage power consumption.

The advantages of the invention are numerous. Different embodiments or implementations may have one or more of the following advantages. One advantage of the invention is that it offers improved power management that is obtained by a layered approach. Another advantage of the invention is that the system power management provided by the invention includes power management (i.e., shutdown) for not only processors but also related control circuitry (e.g., bus controllers, I/O controllers, memory controllers, interrupt controllers). Still another advantage of the invention is that deterministic control over power management of control circuitry provides proper sequencing of shutdown operations. Yet another advantage of the invention is that more aggressive power management of a computer system is provided, whether for a single processor or a multi-processor system.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to power management for computer systems having one or more processors. One aspect of the invention pertains to providing hierarchical power management. The hierarchical nature of the power management provided by the invention has various levels of power management such that power consumption of the computer system is dependent upon the amount of work placed on the processing resources of the computer system. Another aspect of the invention pertains to deterministic handshaking provided between a power manager and one or more controller units. The deterministic handshaking provides for more reliable and controllable transitions between power management states which have associated power management taking place in the controller units. The invention is suitable for use with a single-processor computer system or a multi-processor computer system.

Embodiments of the invention are discussed below with reference to FIGS. 1A–14B. However, those skilled in the art will readily appreciate that the detailed description given herein with respect to these figures is for explanatory purposes as the invention extends beyond these limited embodiments.

Figure 1A:
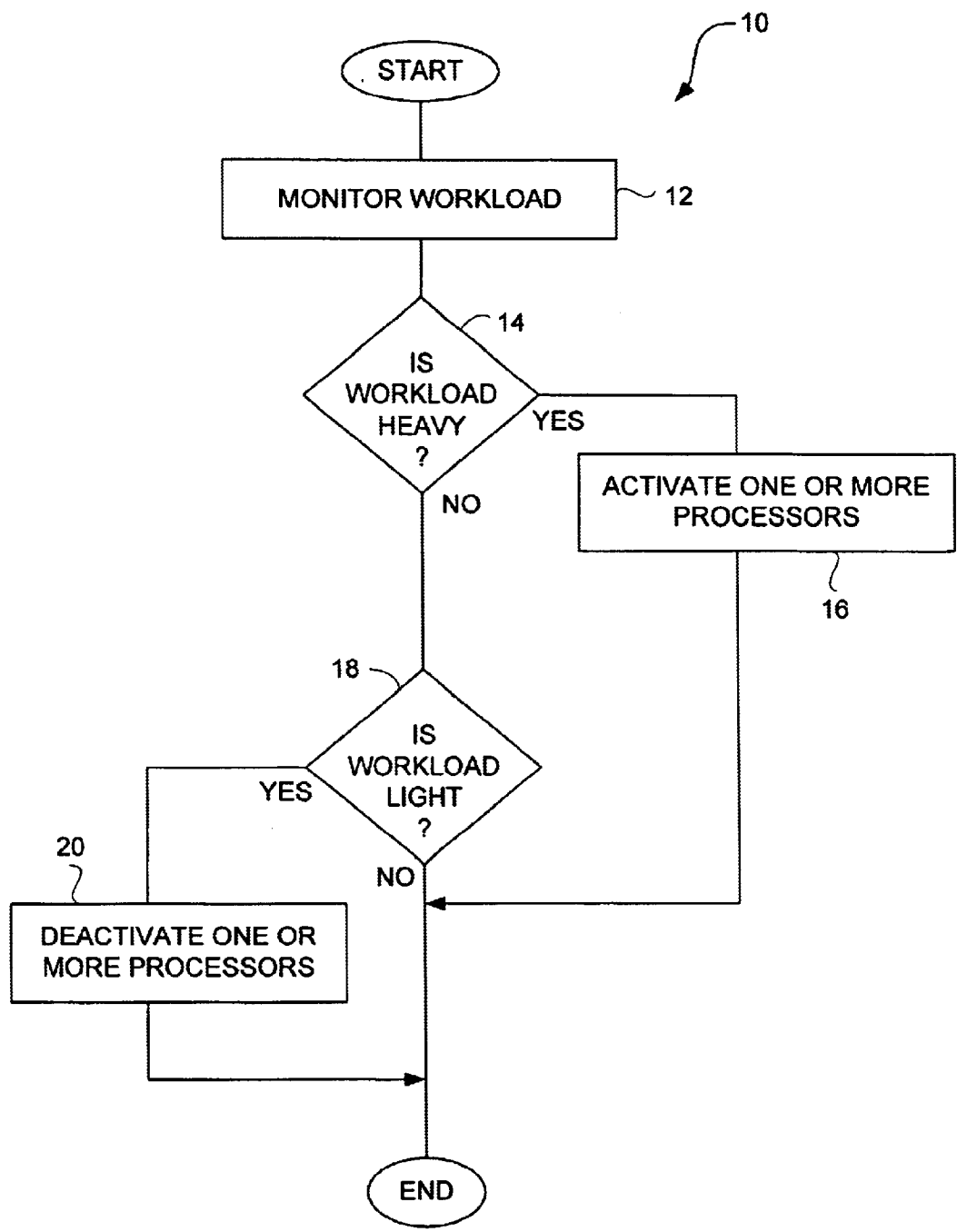
FIG. 1A is a flow diagram of power management processing according to a basic embodiment of the invention.

FIG. 1A is a flow diagram of power management processing 10 according to a basic embodiment of the invention. The power management processing 10 is performed by a multi-processor computer system to reduce the power consumption of any processing resources whenever those resources are not needed.

The power management processing 10 monitors 12 the workload of the computer system or the processors within the computer system. The workload reflects how busy the computer system or the processors therein are in processing useful tasks. Once the workload is obtained, it is determined 14 whether the workload is heavy.

When it is determined 14 that the workload is heavy, then one or more processors of the computer system are activated 16. Here, the heavy workload indicates that additional processing resources are needed. By activating 16 one or more of the processors (that were previously inactive), the computer system obtains the additional processing resources to help process the heavy workload.

Assume a simplistic example in which the workload is 1000 units of work that is waiting to be processed by the computer system. If only one processor is active, the workload of the one processor can be considered 1000 units. If a heavy workload is deemed anything over 600 units, then the power management processing 10 will operate to activate one or more additional processors. If one additional processor were to be activated 16, then the average workload for each of the two activated processors would drop to 500 units.

On the other hand, when it is determined 14 that the monitored workload is not heavy, it is determined 18 whether the monitored workload is light. When it is determined 18 that the monitored workload is light, then one or more processors of the computer system are deactivated 20. By deactivating 20 one or more of the processors, the computer system conserves power by placing the computer system, or its processors, into a lower powered state.

Following blocks 16 and 20, as well as following the decision block 18 when the workload is not light, the power management processing 10 is complete and ends. However, typically, the power management processing 10 continuously repeats such that the power management for the computer system is ongoing and dynamically performed.

According to the invention, the deactivation 20 of one or more of the processors can be performed in a wide variety of ways. In particular, the deactivation 20 can be performed over a series of low power states into which the computer system can enter (or low power modes into which its processors can enter) to conserve power. The deactivation 20 can also be considered to be performed over a series of layers such that different layers offer different tradeoffs of processing resources verses power efficiency.

Figure 1B:
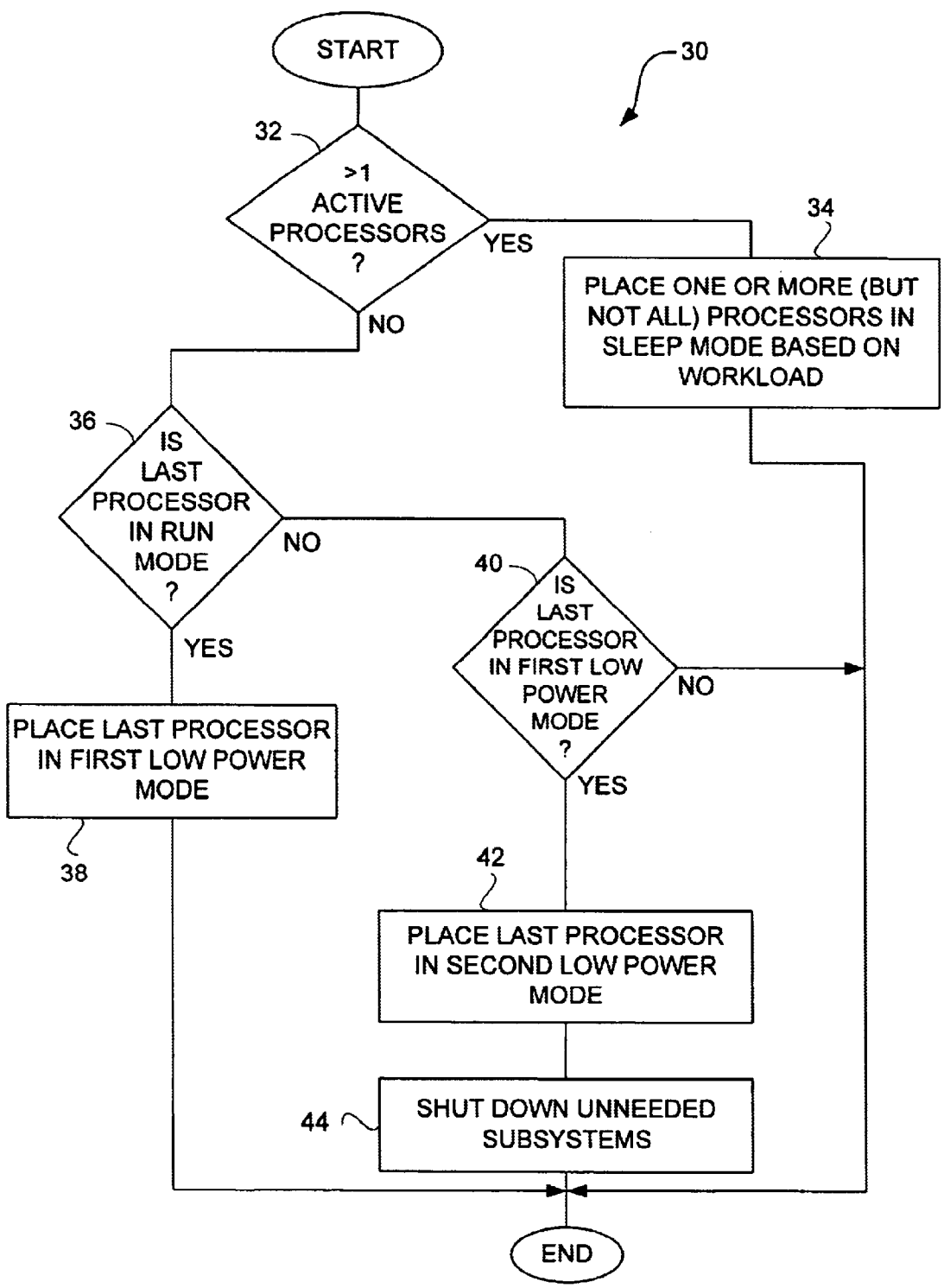
FIG. 1B is a flow diagram of processor deactivation processing according to one embodiment of the invention.

FIG. 1B is a flow diagram of processor deactivation processing 30 according to one embodiment of the invention. The processor deactivation processing 30 is, for example, suitable for use as the deactivation 20 of the one or more processors such as shown in FIG. 1A.

The processor deactivation processing 30 initially determines whether there is more than one active processor. When it is determined 32 that there is more than one active processor, the processor deactivation processing 30 places 34 one or more (but not all) of the processors in a sleep mode. The number of the processors being placed in the sleep mode is based on the workload. For example, in a computer system having five processors, the processor deactivation processing 30 could shutdown up to four of the processors by placing them in the sleep mode when the workload is light.

On the other hand, when it is determined 32 that there is only one active processor, then the processor deactivation processing is performed for the last processor in a layered fashion. In particular, it is initially determined 36 whether the last processor is in a run mode. The run mode is a mode in which the last active processor is active such that it processes instructions. When it is determined that the last processor is in the run mode, then the last processor is placed 38 in a first low power mode. In this embodiment, the first low power mode is a mode in which the processor conserves some power but has a loss of performance as compared to the run mode.

Alternatively, when it is determined 36 that the last processor is not in the run mode, it is determined 40 whether the last processor is in the first low power mode. When it is determined 40 that the last processor is already in the first lower power mode, then the processor deactivation processing 30 can perform additional operations to provide greater reductions in power consumption. Specifically, the last processor is placed 42 in a second low power mode. The second low power mode is a mode that offers less power consumption (as well as less performance) than does the first low power mode. Next, any unneeded electrical components or units of the computer system are shut down 44. On the other hand, when it is determined 40 that the last processor is not in the first low power mode, it is assumed that the last processor is already in the second low power mode such that additional processing by the processor deactivation processing 30 is not available and, thus, the processor deactivation processing 30 is complete and ends. In addition, following blocks 34, 38 and 44, the processor deactivation processing 30 is complete and ends.

The processor deactivation processing 30 can be considered to have multiple hierarchical levels. For example, with respect to a multi-processor computer system, the processor deactivation processing 30 offers three layer of power management. A first layer is provided by block 34 such that the number of processors that are active (and not sleeping) is determined based on workload. Within the first layer there are various different levels of power management based largely on the number of processors activated. In any case, once only one of the processors is active, than a second layer can be entered for further power reduction. In the second layer provided by block 38, the last active processor is placed in the first low power state. Still further, if further power reduction is further desired, then the last active processor can by placed in the second low power mode. Typically, the second power mode would placed the last active processor in even a greater power saving state than provided by the first low power mode. Additionally, since the second low power mode essentially deactivates the last active processor, various other electrical components or units within the multi-processor computer system can also be placed in a low-power state (or shut-down) to further enhance the power reductions. For example, the electrical components or units can include controllers (e.g., controller chips) or unneeded subsystems. Often, some subsystem can be shutdown in other earlier layers.

A third low power mode could also be provided by the processor deactivation processing 30. The third low power mode would offer even greater power reductions than provided in the first and second low power modes. For example, in the third low power mode, the last processor could be placed in the sleep mode and, thus, with all processors in the sleep mode, the computer system would itself be in a sleep mode. More than three low power modes could also be provided. The various low power modes can include, for example, nap, doze or sleep modes for a processor as well as also remove clocks and power from a processor and/or other electrical components in certain of the various low power states.

Although the invention is described herein largely in terms of a multi-processor computer system, the invention is also applicable to single processor computer systems. As an example, blocks 34–44 of FIG. 1B in effect pertain to power management for single processor computer systems.

Figure 1C:
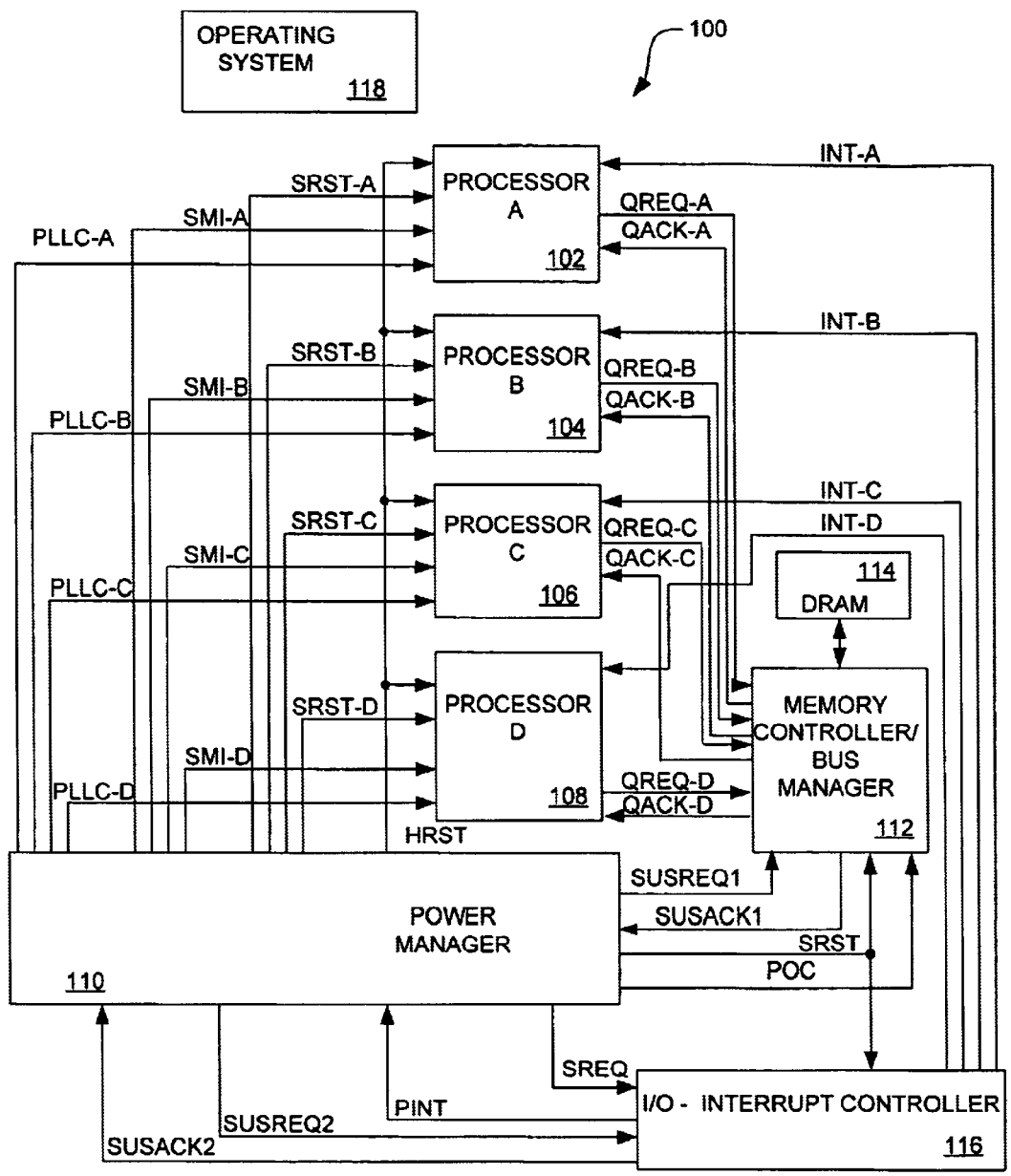
FIG. 1C is a block diagram of a multiple processor computer system according to one embodiment of the invention.

FIG. 1C is a block diagram of a multiple processor computer system 100 according to one embodiment of the invention. The multiple processor computer system 100 includes a plurality of processors, including processor A 102, processor B 104, processor C 106 and processor D 108. Each of the processors 102–108 operates to execute instructions under the control of an operating system (not shown). The multiple processor computer system 100 also includes a power manager 110 that provides power management functions for the multiple processor computer system 100. In general, the power manager 110, provides soft resets (SRST), hard resets (HRST), system management interrupts (SMIs), and configuration control signals for phase lock loops (PLLs). In one embodiment, the power manager is an embedded controller or processor. The multiple processor computer system 100 also includes a memory controller/bus manager (MCBM) 112, a dynamic random access memory (DRAM) 114, an I/O-interrupt controller (IOIC) 116, and an operating system 11. Although not shown in FIG. 1C, the multiple processor computer system 100 would also include other components such as Read Only Memory (ROM), system bus, display controller, etc.

The processors 102–108 operate to perform program instructions under the control of operating system 118. For processor mode control, processors 102-108 communicate with the memory controller/bus manager 112 using a hardware-handshake. The hardware-handshake controls when the processors 102–108 are able to enter a lower power state. The processor A 102 supplies a quiescent request (QREQ-A) to the memory controller/bus manager 112. Likewise, the processor B 104, the processor C 106, and the processor D 108 respectively supply quiescent signals (QREQ-B, QREQ-C, and QREQ-D) to the memory controller/bus manager 112. When the memory controller/bus manager 112 determines that all of the quiescent requests QREQ-A, QREQ-B, QREQ-C, and QREQ-D all are asserted, then the memory controller/bus manager 112 asserts quiescent acknowledgement signals (QACK-A, QACK-B, QACK-C, and QACQ-D) back to each of the processors 102–108, after any snoop cycles are completed. Hence, the hardware-handshake between the processors 102–108 and the memory controller/bus manager 112 are provided by the quiescent request signals (QREQ) and the quiescent acknowledgement signals (QACK).

Another hardware-handshake is provided between the power manager 110 and the memory controller/bus manager 112. The hardware-handshake utilizes a suspend request (SUSREQ1) and a suspend acknowledgement (SUSACK1). When the power manager 110 asserts the suspend request (SUSREQ1) the memory controller/bus manager 112 is instructed to enter a shut-down mode if a sleep bit has been previously set or to enter an idle mode when an idle bit has been previously set. After the memory controller/bus manager 112 completes its processing to enter either its shut-down mode or the idle mode, the suspend acknowledgement (SUSACK1) is asserted to indicate that the memory controller/bus manager 112 is in now in the requested mode. The power manager 110 also supplies a system reset (SRST) and a power-on clear (POC). The system reset (SRST) resets the one or more devices on buses being managed by the memory controller/bus manager 112. The system reset (SRST) affects the memory controller portion of the memory controller/bus manager 112 such that the contents of DRAM 114 are preserved, to aid in post-reset recovery and de-bugging when power to the DRAM 114 has been maintained. The power-on clear (POC) allows the power manager 110 to reset the memory controller portion of the memory controller/bus manager 112 and well as the DRAM 114 when the power to the DRAM 114 has previously been turned off.

The power manager 110 also interacts with the I/O-interrupt controller 116 to support the incoming interrupts when the processors 102–108 are in a low power (or sleep) mode. More particularly, when the processors 102–108 are active, the I/O-interrupt controller 116 provides interrupts INT-A, INT-B, INT-C and INT-D to each of the processors 102–108, respectively. However, after the power manager 110 asserts a sleep request (SREQ) to the I/O-interrupt controller 116, the I/O-interrupt controller 116 no longer supplies incoming interrupts to the processors 102–108 (which are inactive) but instead supplies a combined processor interrupt (PINT) to the power manager 110. The power manager 110 monitors the combined processor interrupt (PINT) to determine when interrupts need to be serviced. The I/O-interrupt controller 116 also receives the system reset (SRST) from the power manager 110. The system reset (SRST) is used to reset the I/O-interrupt controller 116.

There is also a hardware-handshake between the power manager 110 and the I/O-interrupt controller 116. The hardware-handshake utilizes a suspend request (SUSREQ2) and a suspend acknowledgement (SUSACK2). When the power manager 110 asserts the suspend request (SUSREQ2), the I/O-interrupt controller 116 is instructed to enter a low power (or sleep) mode, in which the clocks for the I/O-interrupt controller 116 are stopped. After the I/O-interrupt controller 116 completes its processing to enter the low power mode, the suspend acknowledgement (SUSACK2) is asserted to indicate to the power manager 110 that the I/0-interrupt controller 116 is now in the low power mode. In one embodiment, even when the I/O controller 116 is in the low power mode, interrupts can still be received in an asynchronous manner.

In one embodiment, the processors 102–108 themselves have a plurality of power modes, including run, doze, nap and sleep. When it is determined (e.g., by operating system) that an individual processor is idle, a nap bit for the processor can be set to cause the processor to enter a doze mode. When all of the processors have entered a doze mode, and the memory controller/bus manager 112 is idle, all the processors can transition from a doze mode into a nap mode. However, once in the nap mode, if a snoop operation is needed, the processors will return from the nap mode to the doze mode so that the snoop operations can be performed. Also, if an interrupt arrives for a processor in a nap mode, the processor will transition to a run mode so that the interrupt can be handled. The power management performed within processors is further described below with respect to FIGS. 13A–13C.

Figure 2:
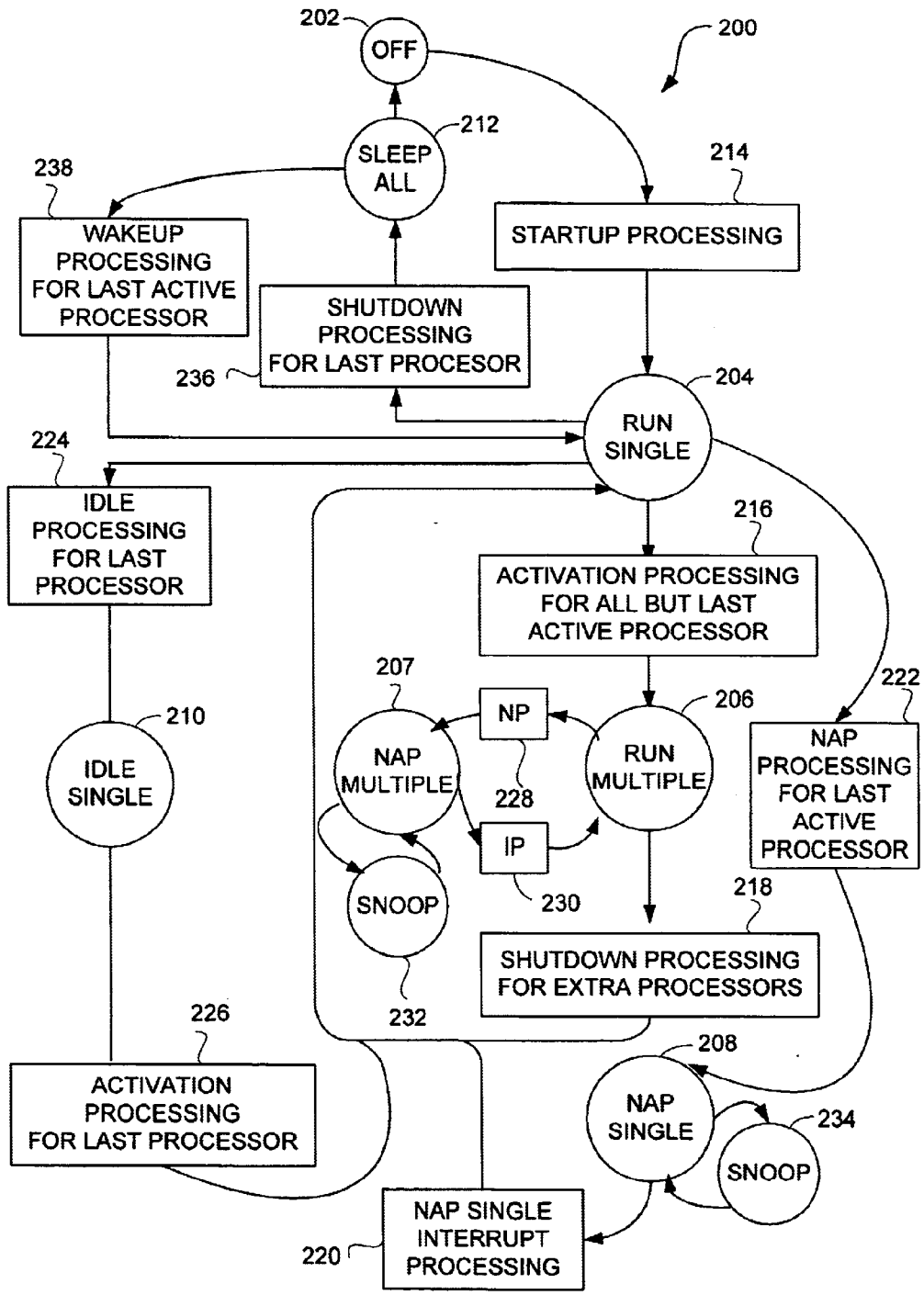
FIG. 2 is a flow diagram of power management processing according to one embodiment of the invention.

FIG. 2 is a flow diagram of power management processing 200 according to one embodiment of the invention. The power management processing 200 is performed by a multiple processor computer system. For example, the multiple processor computer system 100 illustrated in FIG. 1C can perform the power management processing 200.

The power management processing 200 illustrates transitioning between different states of power management. These different states allow for a layered approach to power management for a multiple processor computer system. In this embodiment, the power management states include an off state 202, a run single state 204, a run multiple state 206, a nap multiple state 207, a nap single state 208, an idle single state 210, and a sleep all state 212.

Each of the power management states offers a different tradeoff between processing capabilities and power consumption. In order of processing capabilities, from most to least, the power management states in this embodiment are the run multiple state 206, the nap multiple state 207, the run single state 204, the nap single state 208, the idle single state 210, the sleep all state 212, and the off state 202. With respect to power consumption, from least to most, the power management states have the reverse order from that noted immediately above.

The run multiple state 206 refers to the condition in which more than one of the processors are active or, if only one processor is active (run mode), the other processors are in the doze mode and can rapidly be made active.

The nap multiple state 207 refers to the condition in which all processors are in the nap mode. All processor clocks are running and coherent cache storage for the processors is maintained. A processor interrupt causes the state to change to the run multiple state 206.

The run single state 204 refers to the condition in which a single processor is running, and any other processors are placed in the sleep mode with their caches flushed.

The nap single state 208 refers to the condition in which the single processor (from the run single state 204) is in the nap mode and has its processor clock running and its coherent cache storage maintained, while the other processors remain in the sleep mode.

The idle single state 210 refers to the condition in which the single processor (from the run single state 204) is placed in sleep mode with its cache flushed, and all processor clocks are stopped.

The sleep all state 212 refers to the condition in which all processors are powered off with their caches flushed. The processor states are preserved in memory (e.g., DRAM 114). The power manager 110 remains operable by way of a low frequency clock. Various controllers (controllers 112, 116)

and memory (DRAM 114) are also in low power modes but their state is preserved.

The off state 202 refers to the condition (namely, system shutdown) where the entire computer system is powered off.

The processing performed to transition between the various states 202–212 is also illustrated in FIG. 2. To transition from the off state 202 to the run single state 204, startup processing 214 is performed. The startup processing 214 is described in detail below with respect to FIGS. 3A–3C. To transition from the run single state 204 to the run multiple state 206, activation processing 216 for all but a last active processor is performed. The activation processing 216 is described in detail below with respect to FIG. 4. To transition from the run multiple state 206 to the nap single state 208, shutdown processing 218 for extra processors is performed. The shutdown processing 218 is described in detail below with respect to FIG. 5. Once in the nap single state 208, the power management processing 200 may determine that processing power is needed, such as to handle an interrupt that has occurred. Hence, when processing power is needed, nap single interrupt processing 220 can be performed to transition from the nap single state 208 to the run single state 204. The nap single interrupt processing 220 is further described below with respect to FIG. 6. On the other hand, while in the run single state 204, if the power management processing 200 determines that the last active processor is idle and thus less processing power is needed, then nap processing 222 for the last active processor can be performed to transition from the run single state 204 to the nap single state 208. The nap processing 222 for the last active processor is described in detail below with respect to FIG. 7.

Furthermore, from the run single state 204, the power management processing 200 can also enter the idle single state 210. The idle single state offers even more power conservation than is available in the nap single state 208. In any case, to transition from the run single state 204 to the idle single state 210, idle processing 224 for the last processor is performed. The idle single state 210 could also be entered from the nap single state 208 (e.g., via processing 220 and then processing 224), such as after the last processor is idle in the nap single state 208 for a predetermined period of time. The idle processing 224 for the last processor is further described below with respect to FIGS. 8A and 8B. Once in the idle single state 210, when the power management processing 200 needs additional processing power, activation processing 226 for the last processor can be performed to transition from the idle single state 210 to the run single state 204. The activation processing 226 for the last processor is further described below with respect to FIG. 9.

Still further, once in the run multiple state 206, the power management processing 200 may determine that particular processors are not needed due, for example, to blocked processes or light workloads. In such cases, the power management processing 200 can cause these processors to enter a doze mode and when all the processors have entered the doze mode, nap processing 228 is performed to transition to the nap multiple state 207 where all the processors are in the nap mode. The nap processing 228 is similar to processing described with respect to FIG. 7. Then, when processing power is needed such as to process an interrupt, interrupt processing 230 is performed to transition to the run multiple state 206. Here, at least the processor receiving the interrupt is returned to a run mode. The interrupt processing 230 is similar to processing described with respect to FIG. 6.

Further, when processors are in the nap mode, they are unable to permit a snoop transaction of a bus or memory. The applies to both the nap single state 208 and the nap multiple state 207. Hence, from the nap multiple state 207, snoop processing 232 can be performed to return the multiple processors from their nap modes to their doze modes so that the snoop transactions can be performed. After the snoop transactions have been completed, the multiple processors are returned to their nap modes and thus the nap multiple state 207. Likewise, from the nap single state 208, snoop processing 234 can be performed to return the last processor from its nap mode to its doze mode so that the snoop transactions can be performed. After the snoop transactions have been completed, the last processor is returned to its nap mode and thus the nap single state 208. One embodiment of snoop processing is further described below with reference to FIG. 12.

When no processing is needed, then the power management processing 200 performs shutdown processing 236 for the last processor. The shutdown processing 236 transitions the power management processing 200 from the run single state 204 to the sleep all state 212. The shutdown processing 236 is, for example, described in more detail below with respect to FIGS. 10A and 10B. From the sleep all state 212, if the power management processing 200 determines that processing power is again needed, then wakeup processing 238 for the last active processor can be performed to transition from the sleep all state 212 to the run single state 204. The wakeup processing 238 is, for example, illustrated in detail below with respect to FIG. 11 as well as FIG. 3C.

Finally, if the computer system is to be completely turned off, the power management processing 200 typically transitions from the run single state 204 to the off state 202 through the sleep state 212. Hence, to enter the off state 202, the shutdown processing 236 for the last processor is also performed. Additionally, the off state 202 or the sleep state 212 can be entered more directly from the run multiple state 206 by performing the shutdown processing 218 for extra processors as well as the shutdown processing 236 for the last processor.

Figure 3A:
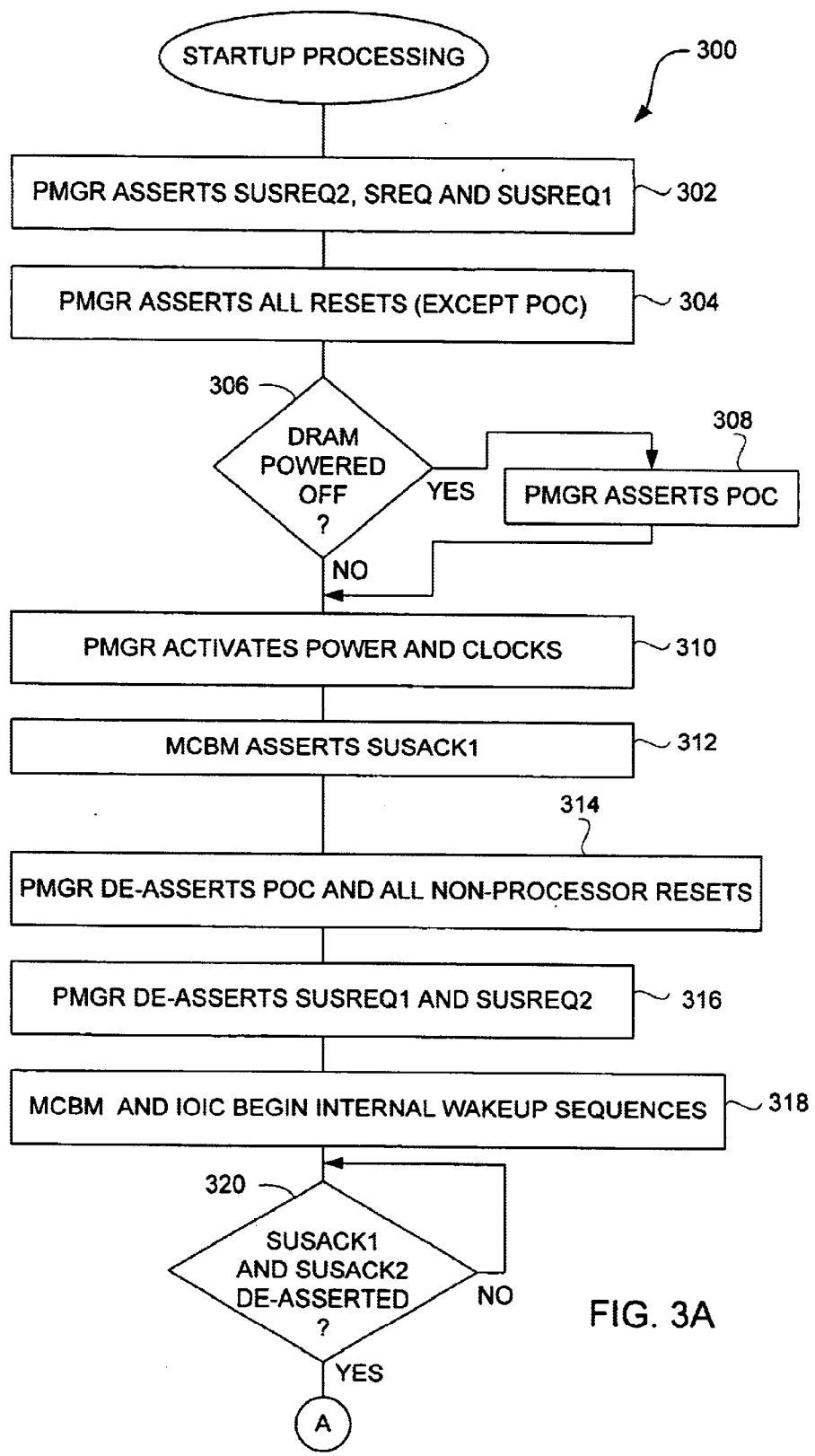
FIGS. 3A–3C are flow diagrams of start processing according to one embodiment of the invention.
Figure 3B:
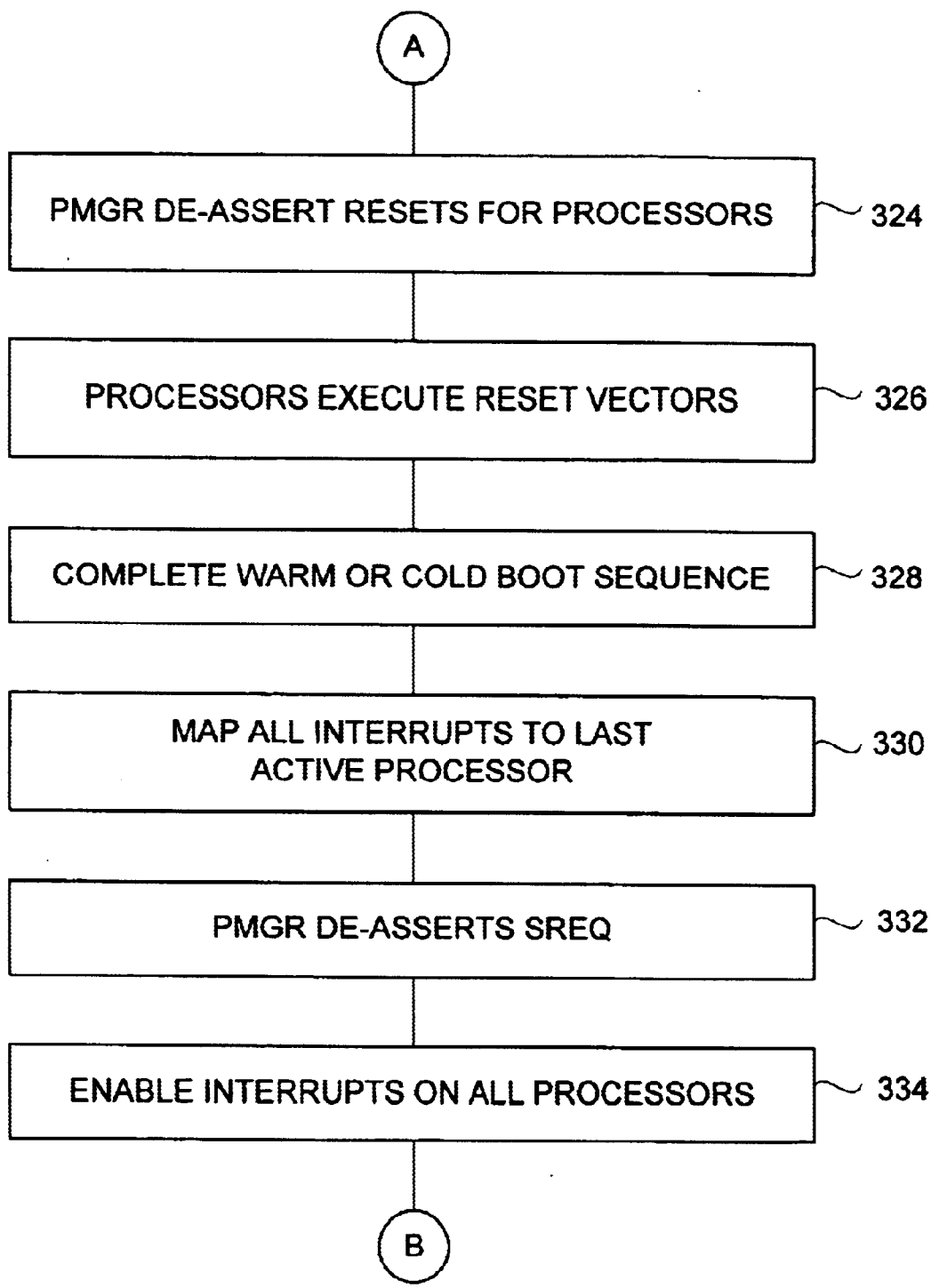
Figure 3C:
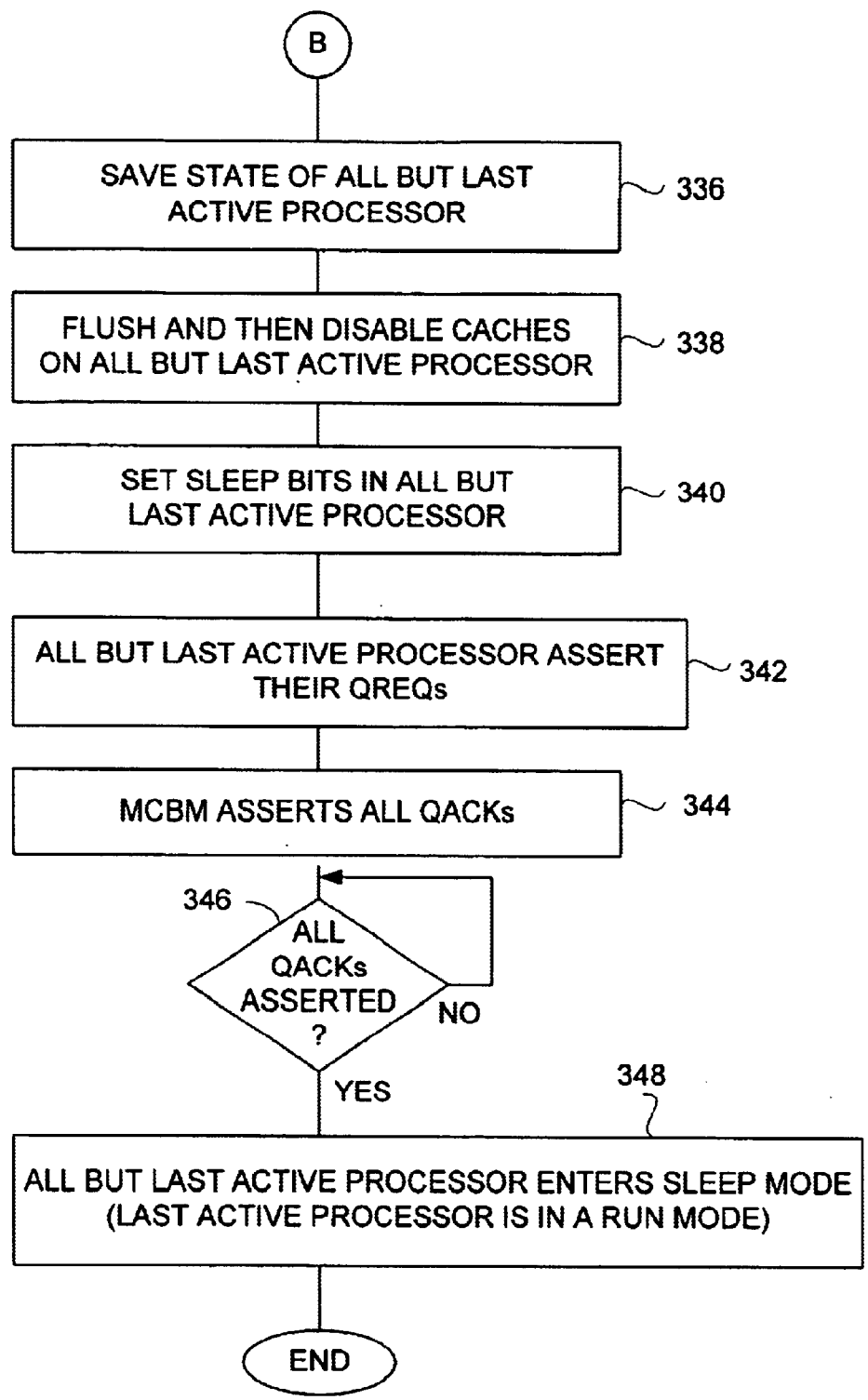

FIGS. 3A–3C are flow diagrams of startup processing 300 according to one embodiment of the invention. The startup processing 300 is, for example, suitable for use as the startup processing 214 illustrated in FIG. 2.

The startup processing 300 is invoked when a startup event occurs. Examples of startup events include a system reset or a power-on. Once the startup processing 300 is invoked, a power manager (PMGR) asserts 302 SUSREQ2, SREQ, and SUSREQ1. The power manager asserts 304 all resets (except the POC). Then, a decision 306 determines whether the DRAM is powered off. When the decision 306 determines that the DRAM is powered off, then the power manager asserts 308 power-on clear (POC).

Following the decision 306 directly when the DRAM is powered off, or otherwise following assertion 308 of POC, a power manager (PMGR) activates 310 all power and clocks for the processors. In one implementation, the activation 310 of the power and clocks can initially turn-on power planes for the processors, start the clocks for the processors, and then activate phase lock loops (PLLs) within the processors. The memory controller/bus manager then asserts 312 SUSACK1. Next, at 314, the power manager de-asserts POC and all non-processors resets that are currently asserted. The power manager also de-asserts 316 SUSREQ1 and SUSREQ2.

Once SUSREQ1 and SUSREQ2 are de-asserted, the memory controller/bus manager and the I/O interrupt controller (IOIC) begin their respective internal wakeup sequences at 318. Next, a decision 320 determines whether the SUSACK1 and SUSACK2 are de-asserted, thus indicating that the wakeup sequences have been completed. When the decision 320 determines that the wakeup sequences are not yet completed, the startup processing 300 awaits their completion. Once the wakeup sequences are determined to be completed, the startup processing 300 continues (see FIG. 3B).

After the wakeup sequences have completed, the power manager then deasserts 324 resets for the processors. After the resets for the processors are deasserted 324, the processors execute 326 reset vectors. Then, the startup processing 300 waits for warm or cold boot sequence to complete 328. Next, all interrupts are mapped 330 to the last active processor. By mapping all the interrupts to the last active processor, the startup processing 300 can prevent all processors but the last active processor from being awakened due to interrupts. Next, the power manager de-asserts 332 SREQ. When SREQ is de-asserted 332, interrupts on all of the processors are enabled 334.

At this point, the startup processing 300 has effectively activated all of the processors. However, since the default state for the system is assumed to be the run single state in this embodiment, additional processing is performed to configure the processors for the run single state. Hence, to transition to the run single state, the following additional processing is performed in the startup processing 300 (see FIG. 3C). Specifically, the state of all but the last active processor is saved 336. Next, the caches on all but the last active processor are flushed and then disabled 338. Sleep bits in all but the last active processor are then set 340. At this point, all the processors but the last active processor also assert 342 their quiescent requests (QREQ). Next, MCBM asserts all QACKs to all the processors asserting QREQ to signal that the memory controller/bus manager is ready to permit those processors to enter a sleep mode. Once a decision 346 determines that all the QACKs have been asserted, then all but the last active processor enter 348 the sleep mode. Here, the last active processor remains in a run mode. Thereafter, the startup processing 300 is complete and ends. At this point, the operating system can also power-up and/or enable any subsystems that are required.

Figure 4:
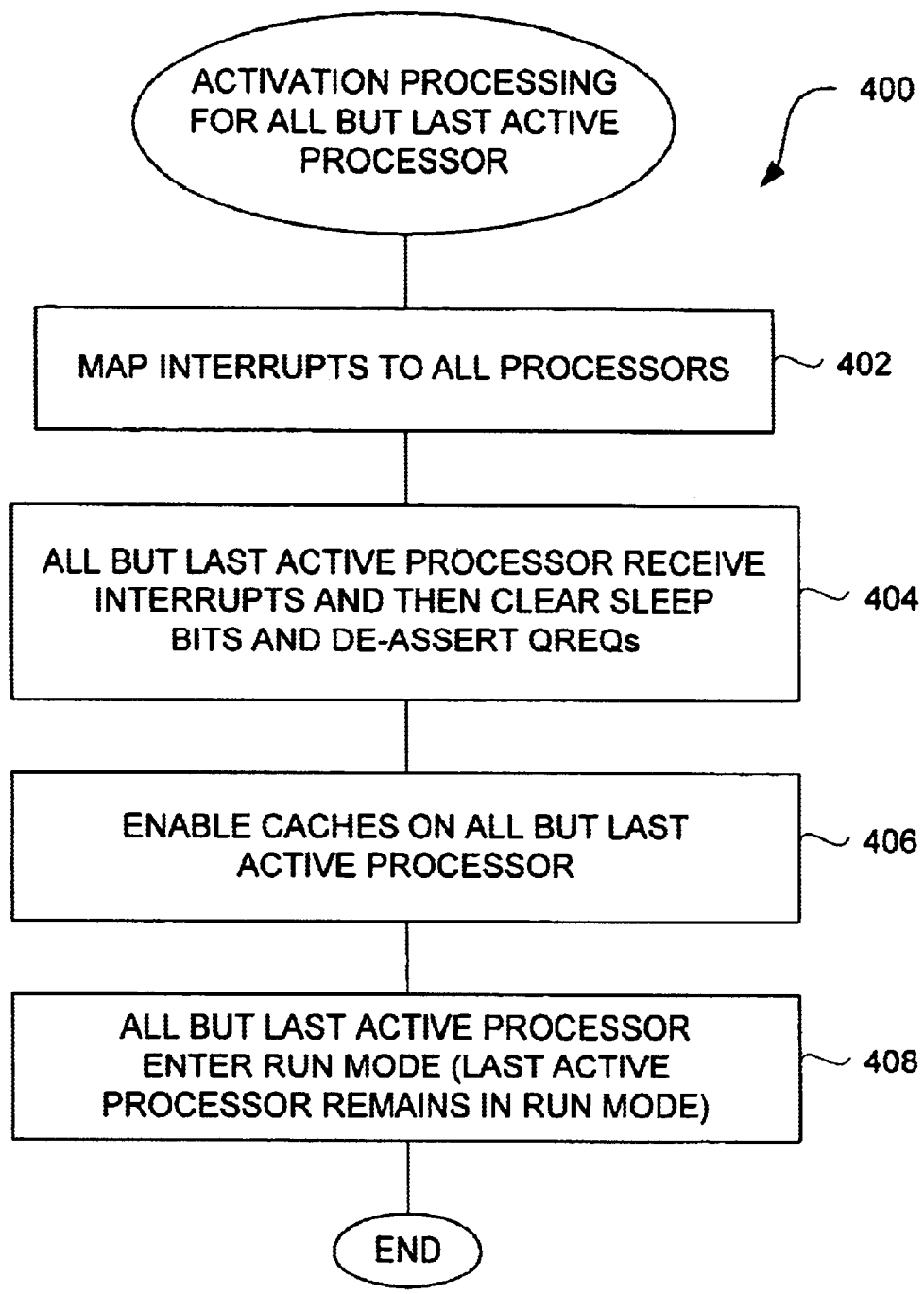
FIG. 4 is a flow diagram of activation processing for all but the last active processor according to one embodiment of the invention.

FIG. 4 is a flow diagram of activation processing 400 for all but the last active processor according to one embodiment of the invention. The activation processing 400 is used for transitioning the processors of the computer system from the run single state 204 to the run multiple state 206.

The activation processing 400 is initiated when the computer system, namely, the operating system, determines that there is a heavy workload and that additional processors are needed to handle the work. In such a case, the activation processing 400 is, for example, suitable for use as the activation processing 216 illustrated in FIG. 2, where it performs the transition from the run single state 204 to the run multiple state 206.

The activation processing 400 initially maps 402 interrupts to all of the processors. After the interrupts have been re-mapped to all of the processors, all the processors in the sleep mode are able to receive interrupts to be awakened. Upon receiving such interrupts, the processors clear their sleep bits and de-assert their quiescent requests (QREQs) at 404 to awaken. These interrupts are typically scheduled by the operating system specifically to induce wakeup but could instead be normal interrupts from peripherals or timers. Since all but the last active processors were previously sleeping, their caches need to be re-enabled when they are awakened. Hence, the caches on all but the last active processors are enabled 406. Next, all but the last active processor enter 408 a run mode. The last active processor need not enter a run mode because it is already in the run mode. The operating system typically then powers-up and/or enables any subsystems of the computer system that are required. Examples of such subsystems include a soundcard, PCI cards, hard disk or other drives, FireWire, Universal Serial Bus (USB), and/or display controller. Also, following the activation of the processors at 408, the activation processing 400 is complete and ends.

Figure 5:
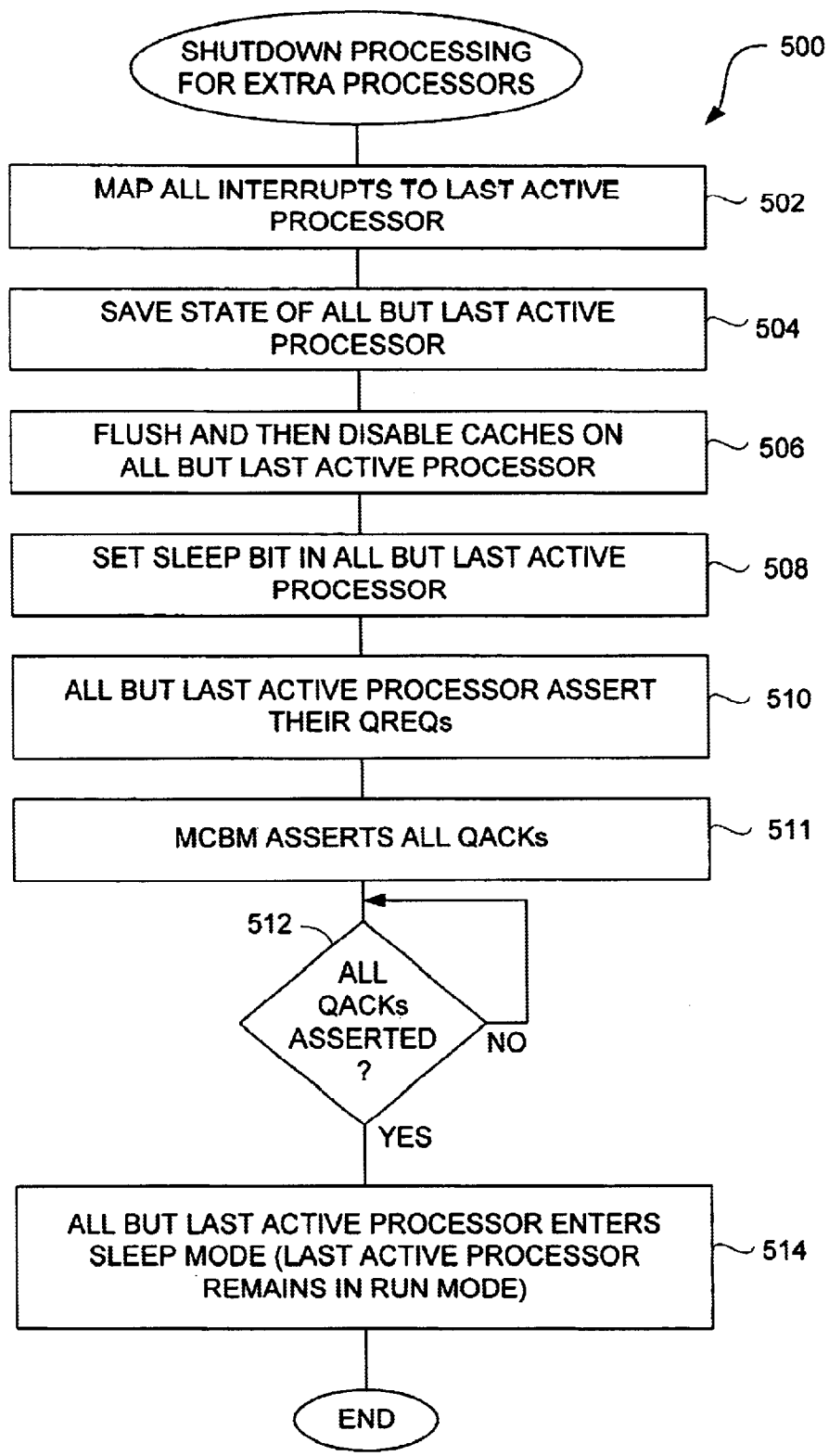
FIG. 5 is a flow diagram of the shutdown processing for extra processors according to one embodiment of the invention.

FIG. 5 is a flow diagram of the shutdown processing 500 for extra processors according to one embodiment of the invention. The shutdown processing 500 is, for example, suitable for use as the shutdown processing 218 illustrated in FIG. 2, where it is utilized to transition the processors of the computer system from the run multiple state 206 to the run single state 204. The shutdown processing 500 is invoked when a light workload is detected by, for example, the operating system. When the shutdown processing 500 begins, the operating system is also able to shut down any appropriate subsystems so as to conserve power.

Once the shutdown processing 500 is invoked, all interrupts are mapped 502 to the last active processor. The state of all but the last active processor is then saved 504. The caches on all but the last active processor are flushed and then disabled 506. Next, the sleep bit is set 508 in all but the last active processor. Then, at 510, all but the last active processor assert their quiescent requests (QREQ) and enter the doze mode. The MCBM asserts 511 QACKs to those of the processors asserting their QREQs to signal that the memory controller/bus manager is ready to permit these processors to enter a sleep mode. Once a decision 512 determines that the QACKs of those of the processors asserting their QREQs have been asserted, then all but the last active processor enter 514 the sleep mode. Here, the last active processor remains in a run mode. Thereafter, the shutdown processing 500 is complete and ends. At this time, the operating system can also power-down and/or disable any subsystems that are required.

Figure 6:
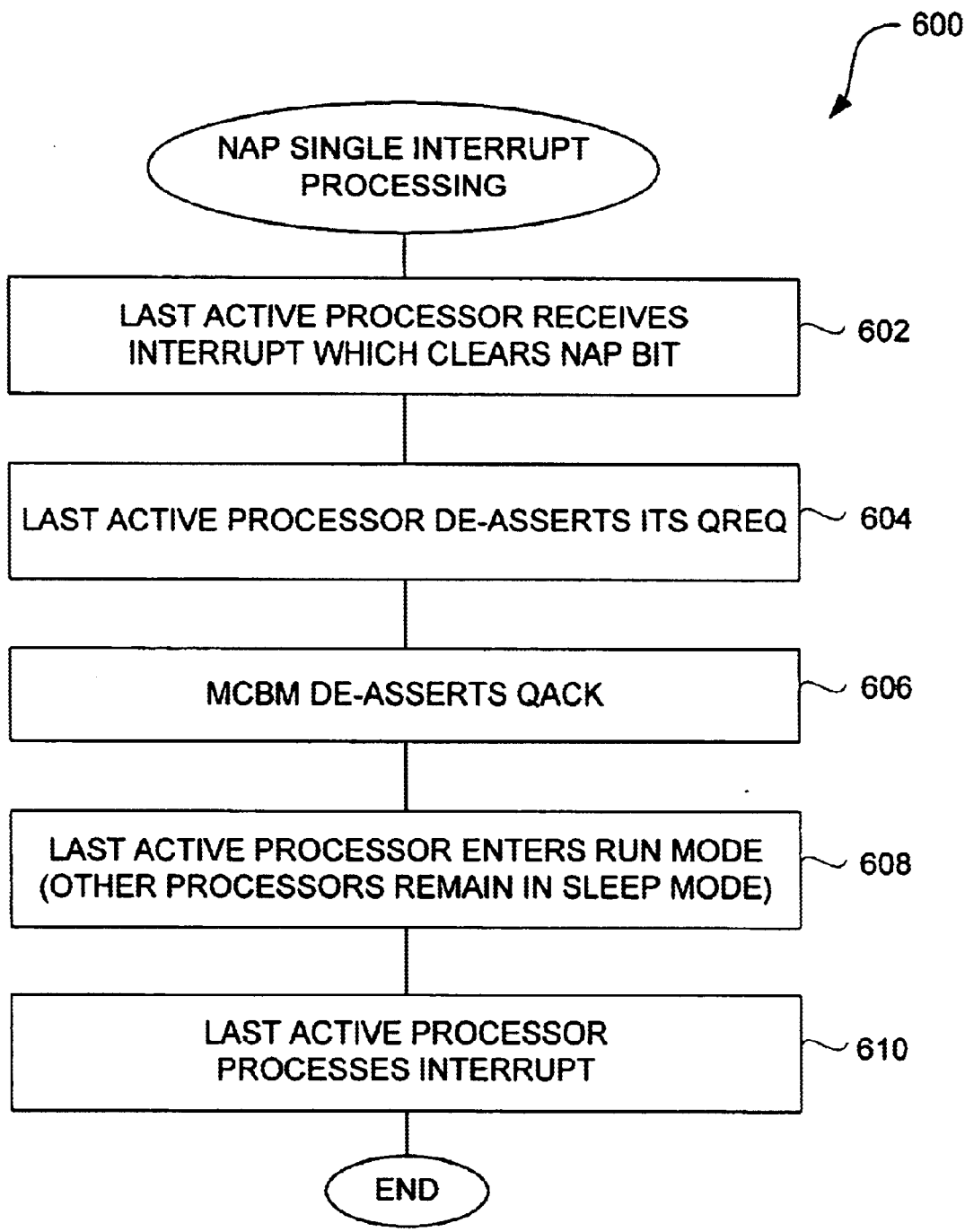
FIG. 6 is a flow diagram of nap single interrupt processing according to one embodiment of the invention.

FIG. 6 is a flow diagram of nap single interrupt processing 600 according to one embodiment of the invention. The nap single interrupt processing 600 is, for example, utilized by the power management processing 200 to transition the processors of the computer system from the nap single state 208 to the run single state 204.

When the last active processor is in the nap mode as is the case in the nap single state 208 and an interrupt is received, the processor receiving the interrupt, (namely, the last active processor) needs to awaken from the nap mode and enter the run mode in order to process the interrupt. The nap single interrupt processing 600 performs the awakening of the last active processor when an interrupt is received.

Once an interrupt is received at the last active processor, the nap bit in the last active processor is cleared 602. Next, the last active processor de-asserts 604 its quiescent request (QREQ). In turn, the memory controller/bus manager de-asserts 606 the quiescent acknowledgement (QACK). After the quiescent acknowledgement (QACK) is de-asserted 606, the last active processor enters 608 the run mode. The other remaining processors remain in their sleep mode. Thereafter, the interrupt that was received can be processed 610 by the last active processor. Following the processing of the interrupt, the nap single interrupt is processing 600 is complete and ends, and the computer system is in the run single state.

Figure 7:
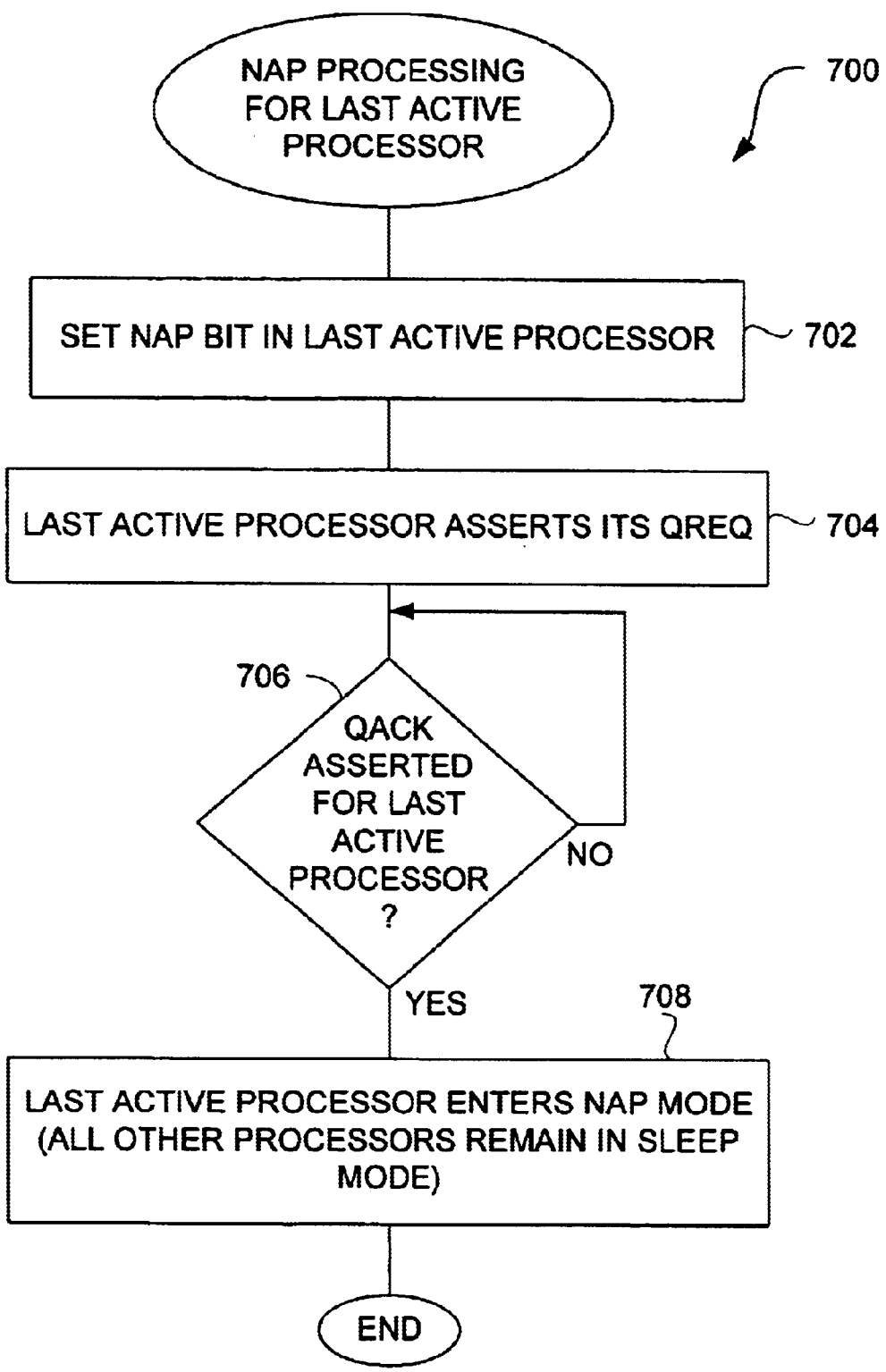
FIG. 7 is a flow diagram of nap processing for the last active processor according to one embodiment of the invention.

FIG. 7 is a flow diagram of nap processing 700 for the last active processor according to one embodiment of the invention. The nap processing 700 is, for example, utilized by the power management processing 200 to transition the processors of the computer system from the run single state 204 to the nap single state 208. In particular, when the operating system detects that the workload has been low or nonexistent for a short period of time, the operating system initiates the nap processing 700.

When the nap processing 700 is initiated, the nap bit is set 702 in the last active processor. Then, at 704, the last active processor asserts 704 its quiescent request (QREQ) and enters the doze mode. Next, it is determined 706 whether the quiescent acknowledgement (QACK) is asserted. When the quiescent request (QREQ) is presently asserted by a processor, and no snoop operations are needed, the memory controller/bus manager asserts the corresponding QACK to that processor. Once the QACK is determined 706 to have been asserted for the last active processor, the last active processor enters 708 the nap mode. Here, all other processors remain in the sleep mode. At this point, the computer system has entered the nap single state 208, and thus the nap processing 700 is complete and ends.

Figure 8A:
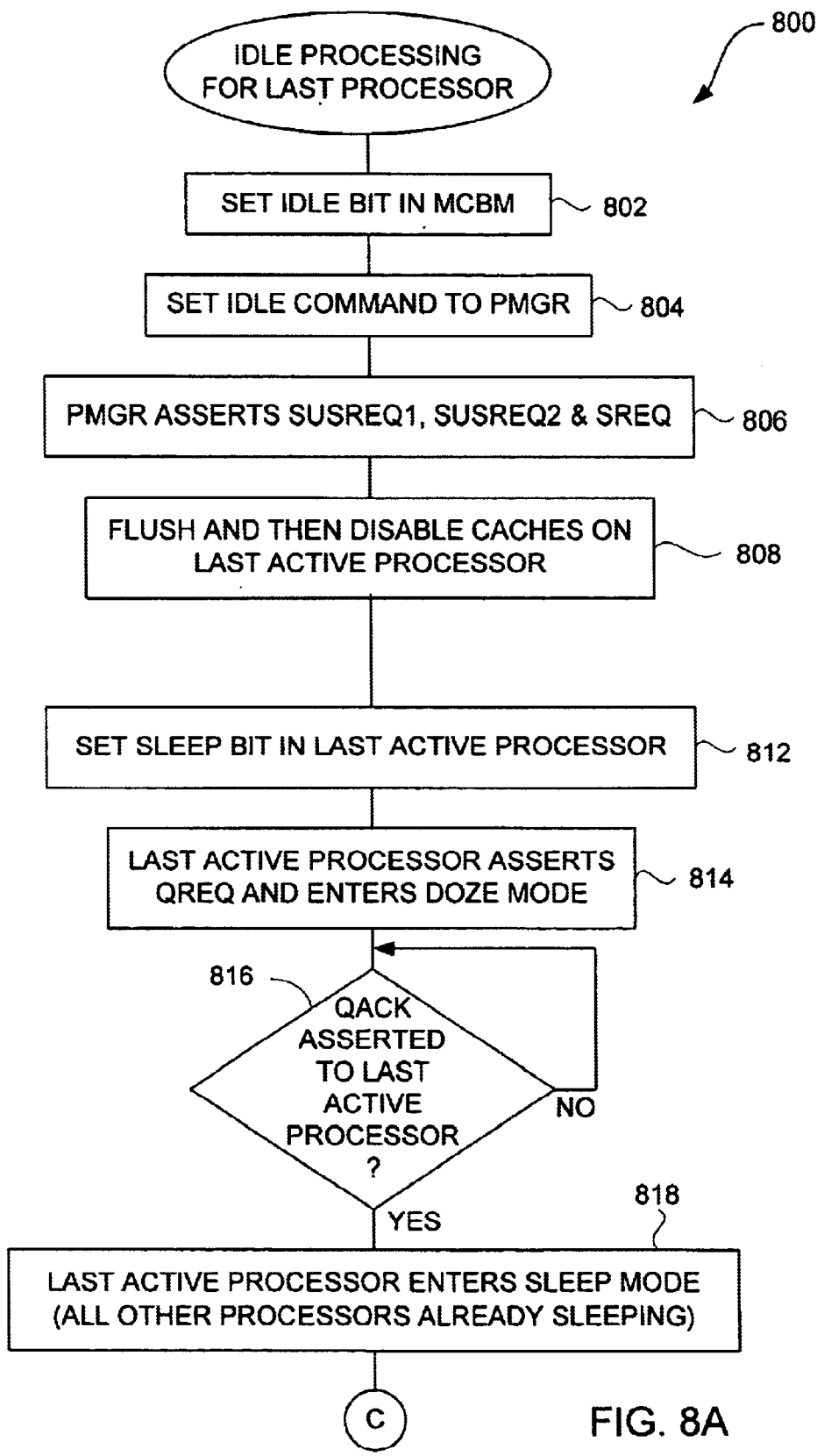
FIGS. 8A and 8B are flow diagrams of idle processing for the last active processor according to one embodiment of the invention.
Figure 8B:
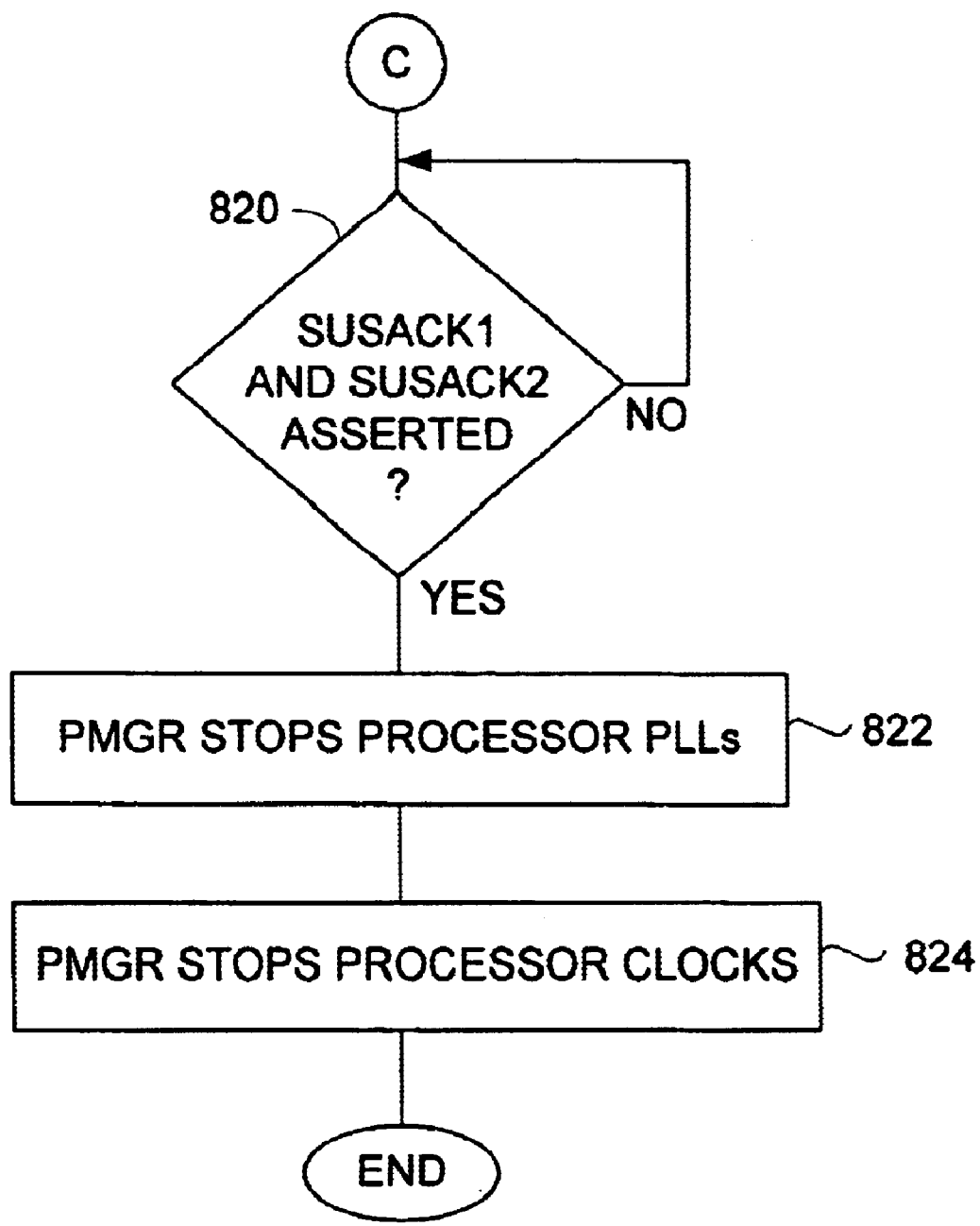

FIGS. 8A and 8B are flow diagrams of idle processing 800 for the last active processor according to one embodiment of the invention. The idle processing 800 is used to transition from the run single state 204 to the idle single state 210. Before invoking the idle processing 800, the operating system typically shuts down any appropriate subsystems of the computer system that are not needed.

The idle processing 800 is invoked when the last active processor has been idle or has no workload for a given period of time. The idle processing 800 initially causes the operating system to set 802 an idle bit in the memory controller/bus manager. Then, an idle command is sent 804 to the power manager. The power manager then, at 806, asserts the suspend request (SUSREQ1) to the memory controller/bus manager, the suspend request (SUSREQ2) to the I/O-interrupt controller, and a stop request (SREQ) to the I/O-interrupt controller. The caches on the last active processor are flushed and then disabled at 808.

Next, the sleep bit in the last active processor is set 812. The last active processor then asserts 814 the quiescent request (QREQ) and enters the doze mode. It is then determined 816 whether the quiescent acknowledgement (QACK) is asserted by the memory controller/bus manager. At this point, the idle processing 800 waits for the QACK to be asserted. When the quiescent request (QREQ) is presently asserted by a processor, and no snoop operations are needed, the memory controller/bus manager asserts the corresponding QACK to that processor. Once it is determined 816 that the QACK has been asserted for the last active processor, the last active processor enters the sleep mode 818. Here, all other processors are already in their sleep mode.

Next, it is determined 820 determines whether the suspend acknowledgments (SUSACK1 and SUSACK2) has been asserted. Here, the idle processing 800 waits for the SUSACK1 and the SUSACK2 to be asserted. Once a decision 820 determines that the SUSACK1 and SUSACK2 have been asserted by the memory controller/bus manager, the power manager stops the phase lock loops (PLLs) used in providing internal clocks to the processors. The power manager then stops 824 the processor clocks 824 (which are typically external to the processors). After the processor clocks are stopped, the idle processing 800 is complete and ends.

Figure 9:
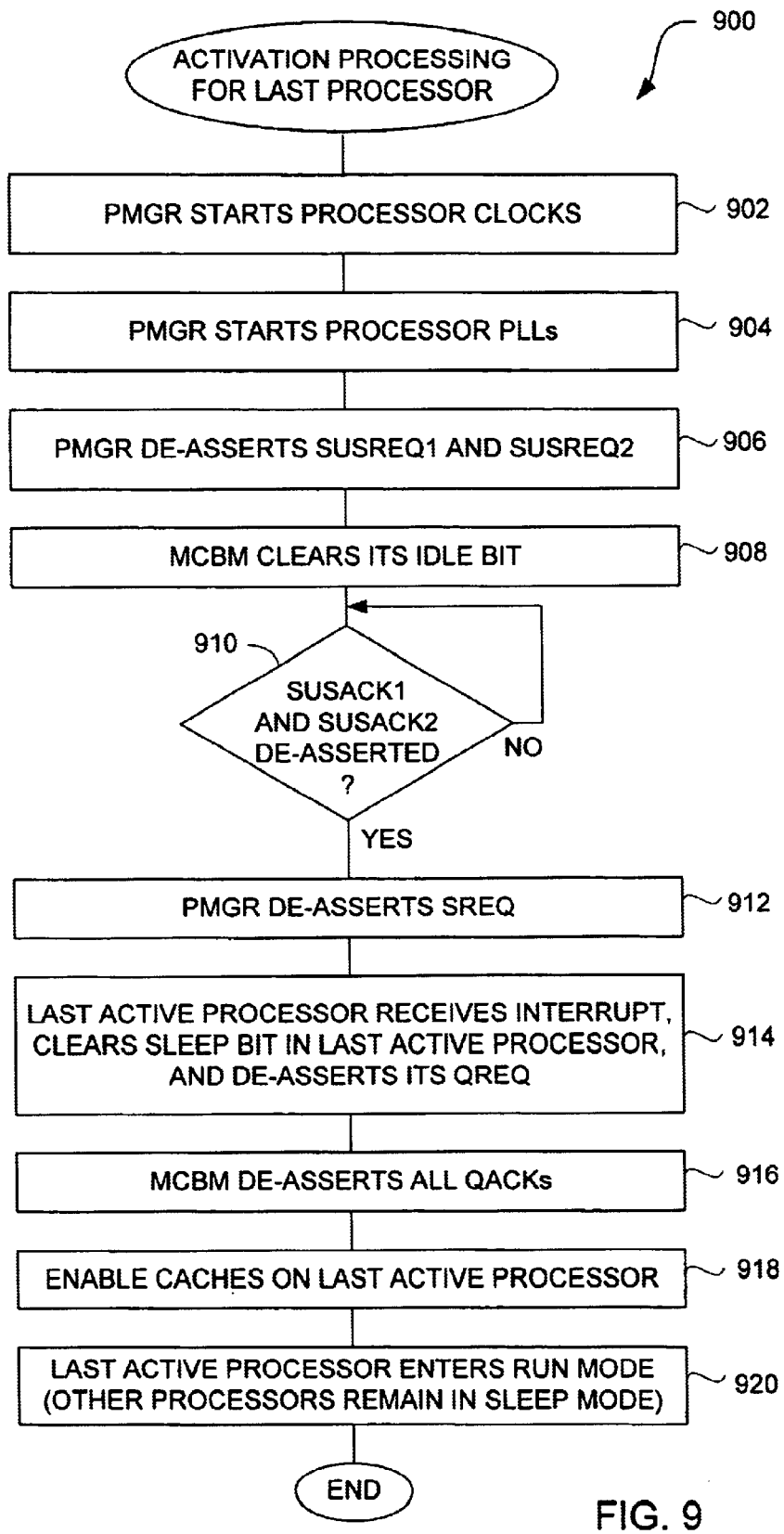
FIG. 9 is a flow diagram of activation processing for the last active processor according to one embodiment of the invention.

FIG. 9 is a flow diagram of activation processing 900 for the last active processor according to one embodiment of the invention. The activation processing 900 operates to transition the computer system from the idle single state 210 to the run single state 204. Before invoking the activation processing 800, the operating system typically powers-up or enables any subsystems of the computer system that are required.

The activation processing 900 is initiated by a wakeup event received at the power manager through the I/O-interrupt controller. Examples of such wakeup events can include an internal timer, a keystroke event, or a processor interrupt (PINT).

Once the activation processing 900 has been invoked, the power manager starts 902 the processor clocks. Then, the power manager starts 904 the phase lock loops (PLLs) used in providing internal clocks to the processors. Once the processor clocks have stabilized, the power manager de-asserts 906 the suspend request (SUSREQ1) to the memory controller/bus manager and the suspend request (SUSREQ2) to the I/O-interrupt controller. The idle bit is then cleared 908. After the idle bit is cleared 908 the memory controller/bus manager has been cleared, the activation processing 900 determines 910 whether the suspend acknowledgements (SUSACK1, SUSACK2) have been de-asserted.

Figure 10A:
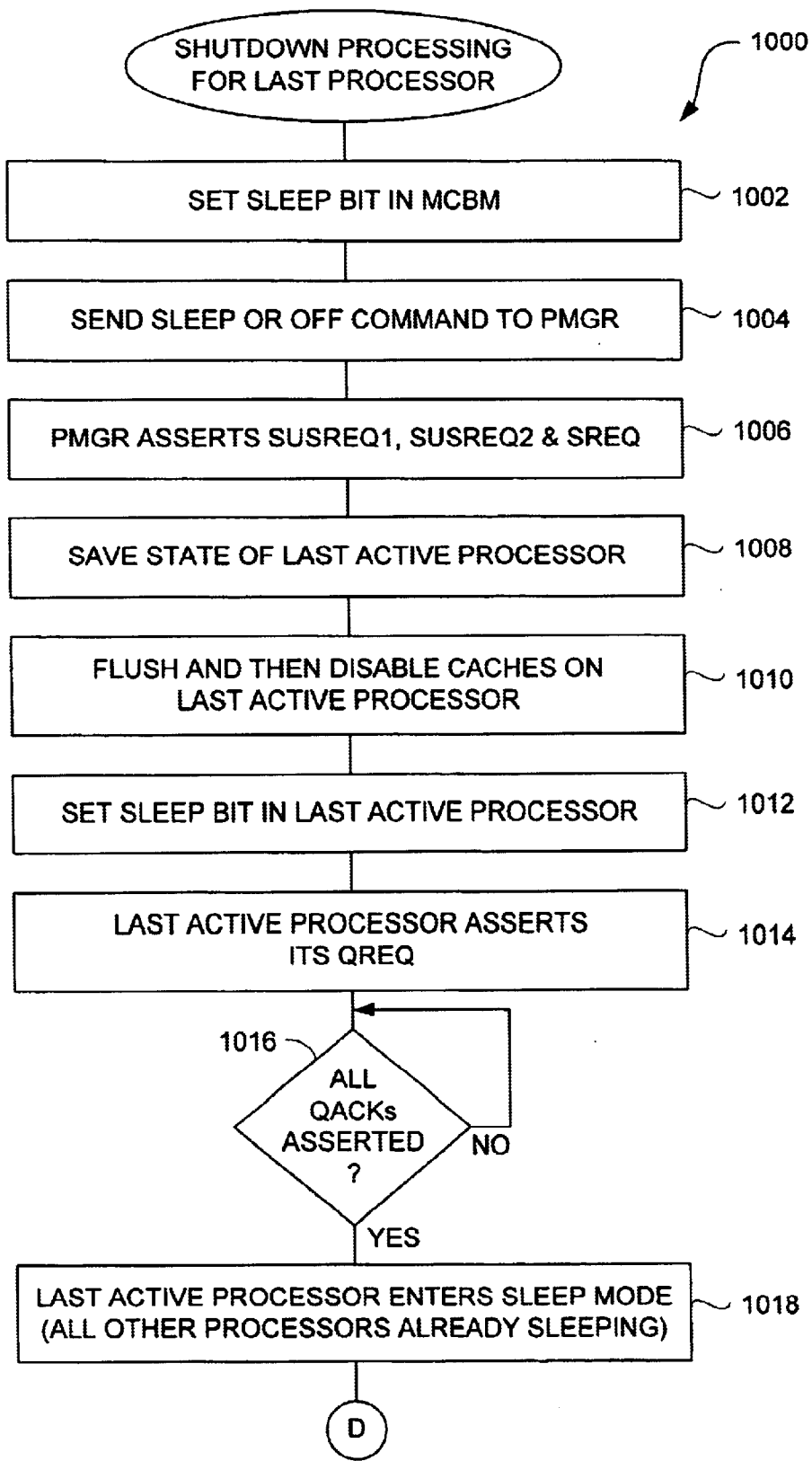
FIGS. 10A and 10B are flow diagrams of shutdown processing for the last active processor according to one embodiment of the invention.
Figure 10B:
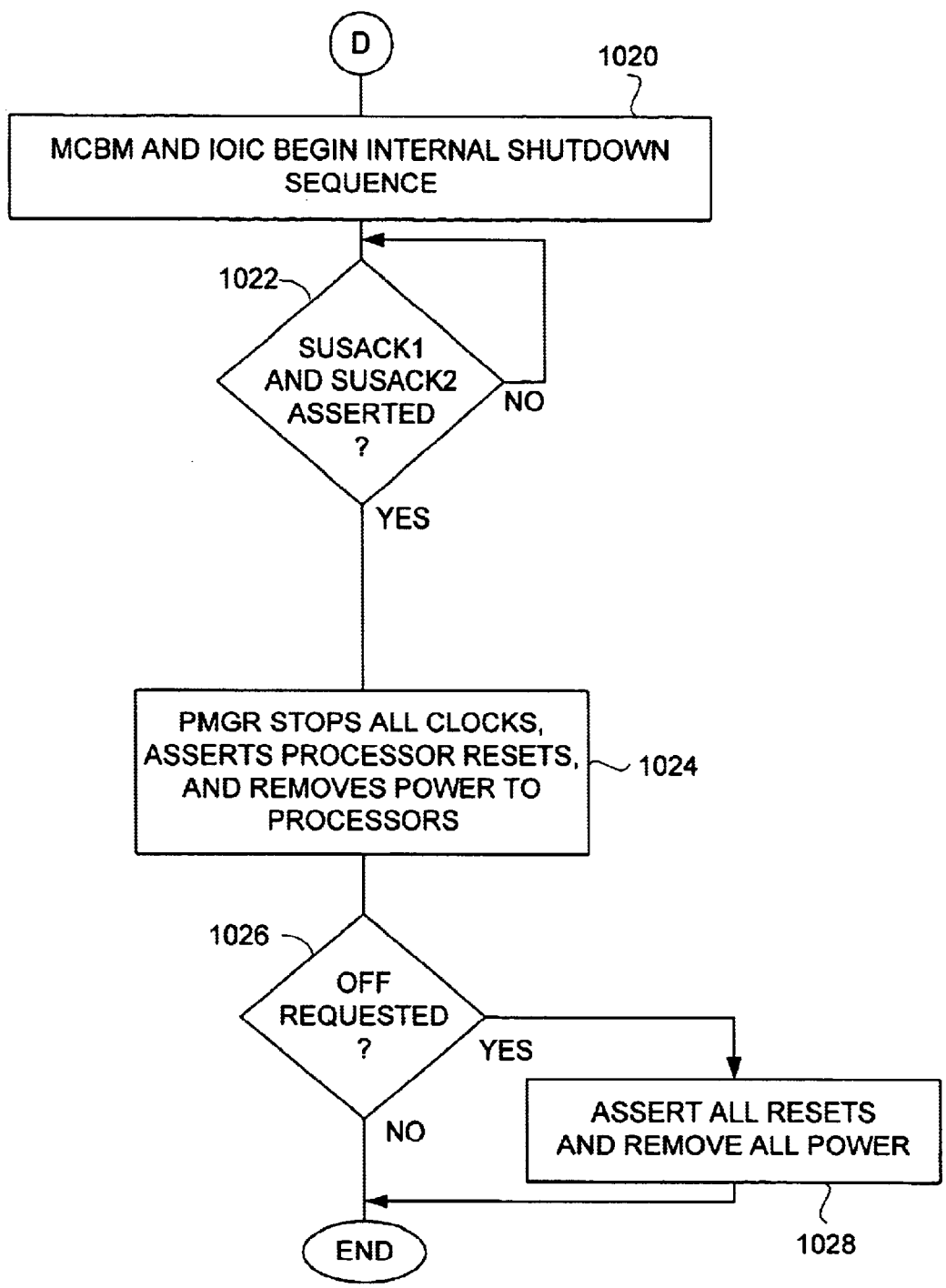

Once the decision block 910 determines that the suspend acknowledgements (SUSACK1, SUSACK2) have been de-asserted, the power manager de-asserts 912 the stop request (SREQ). The last active processor then, at 914, receives an interrupt, operates to clear its sleep bit, and de-assert its quiescent request (QREQ). After any quiescent request (QREQ) is de-asserted, all of the quiescent acknowledgements (QACKs) are de-asserted 916 by the memory controller/bus manager. The caches on the last active processor are enabled 918. Thereafter, the last active processor enters 920 the run mode. Here, the other processors remain in their sleep mode. At this point, the computer system has entered the run single state 204, and thus the activation processing 900 is complete and ends. FIGS. 10A and 10B are flow diagrams of shutdown processing 1000 for the last active processor according to one embodiment of the invention. The shutdown processing 1000 is used to enter either the sleep all state 212 or the off state 202 from the run single state 204.

The shutdown processing 1000 is invoked when a sleep or off request is initiated. The shutdown processing 1000 initially causes the operating system to set 1002 the sleep bit in the memory controller/bus manger. Next, a sleep or off command is sent 1004 to the power manager. When off is requested the off command is used, and when sleep is requested the sleep command is used. The power manager then asserts 1006 the suspend requests (SUSREQ1, SUSREQ2) and the stop request (SREQ). The assertion of the suspend requests (SUSREQ1 and SUSREQ2) cause the memory controller/bus manager and the I/O-interrupt controller to begin their internal shutdown sequences. In one embodiment, with the SUSREQ1 asserted and the sleep bit set, the memory controller/bus manager operates to stop bus activity and stop the PLLs as well as place the DRAM (e.g., DRAM 114) into a self-refresh mode, thus placing the memory controller/bus manager in the sleep mode. The stop request (SREQ) to the I/O-interrupt controller operates to block interrupts to the processors and instead direct the interrupts to the power manager using the combined processor interrupt (PINT). The state of the last active processor is then saved 1008. Caches on the last active processor are flushed and then disabled 1010. The operating system then sets 1012 the sleep bit in the last active processor. After the sleep bit in the last active processor is set 1012, the last active processor asserts its quiescent request (QREQ) and enters the doze mode 1014.

The shutdown processing 1000 then determines 1016 whether the quiescent acknowledgements (QACKs) have been asserted. Once the decision 1016 determines that the quiescent acknowledgement (QACK) has been asserted, the last active processor enters 1018 a sleep mode. Here, all other processors are already in the sleep mode. Thereafter, the memory controller/bus manager and the I/O interrupt controller (IOIC) begin 1020 an internal shutdown sequence. The shutdown processing 1000 then determines 1022 whether the suspend acknowledgements (SUSACK1, SUSACK2) have been asserted. Here, the shutdown processing 1000 awaits the reception of the suspend acknowledgement (SUSACK1) from the memory controller/bus manager and the suspend acknowledgement (SUSACK2) from the I/O-interrupt controller to indicate that their respective internal shutdown sequences have been completed. Once the suspend acknowledgements (SUSACK1, SUSACK2) have been received, the power manager stops all clocks, asserts processor resets, and removes power to the processors at 1024. Then, the shutdown processing 1000 determines 1026 whether the off was requested and used to invoke the shutdown processing 1000. When it is determined 1026 that off has been requested, then the power manager asserts all resets and removes all power at 1028. In this case, the computer system is placed in the off state 202 and the shutdown processing 1000 is complete and ends. On the other hand, when it is determined 1026 that off has not been requested (i.e., sleep requested), then the computer system is placed in the sleep all 212 state and the shutdown processing 1000 is complete and ends. In the sleep all state, the processors do not receive power, but the power manager, the DRAM and the various controllers continue to receive power so that the sleeping processors can be awakened as needed. However, the DRAM and the various controllers are typically also in a low power mode.

Figure 11:
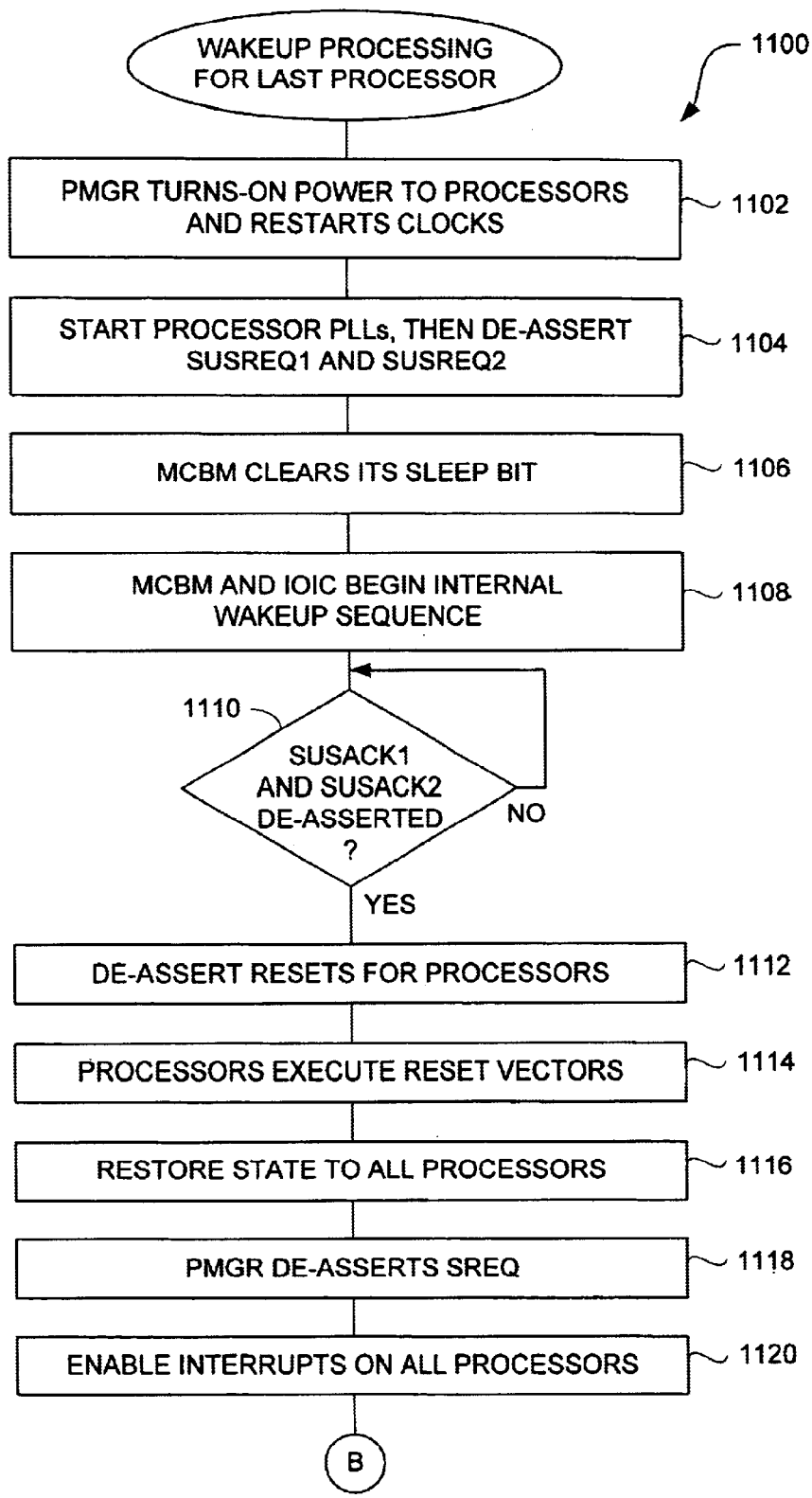
FIG. 11 is a flow diagram of wakeup processing for the last active processor according to one embodiment of the invention.

FIG. 11 is a flow diagram of wakeup processing 1100 for the last active processor according to one embodiment of the invention. The wake up processing 1100 is used to awaken the last active processor from the sleep all state 212 to the run single state 204.

The wakeup processing 1100 is invoked when the power manager receives a wakeup event (e.g., an internal timer, a keystroke event, etc.). Once invoked, the power manager turns-on power to the processors and restarts the clocks at 1102. After the clocks are stable, the power manager starts the processor PLLs and then de-asserts 1104 suspend requests (SUSREQ1, SUSREQ2). At this point, the memory controller/bus manager (MCBM) and the I/O-interrupt controller (IOIC) begins to perform their respective internal wakeup sequences The memory controller/bus manager then clears its sleep bit (1106).

The wakeup processing 1100 then determines 1110 whether the suspend acknowledgements (SUSACK1, SUSACK2) have been de-asserted. In other words, the memory controller/bus manager operates to de-assert the suspend acknowledgement (SUSACK1) when its internal wakeup sequence has been completed, and the I/O-interrupt controller operates to de-assert the suspend acknowledgement (SUSACK2) when its internal wakeup sequence has been completed.

Once the suspend acknowledgements (SUSACK1, SUSACK2) have been de-asserted to indicate the completion of the internal wakeup sequences, the wakeup processing 1100 continues. Namely, the resets for the processors are de-asserted 1112. The processors then execute 1114 their reset vectors. The states for all of the processors are then restored 1116. The power manager then de-asserts 1118 the stop request (SREQ). The interrupts on all of the processors are then enabled 1120. After the interrupts are enabled, the processing follows blocks 336–348 of the startup processing 300 illustrated in FIG. 3C.

Figure 12:
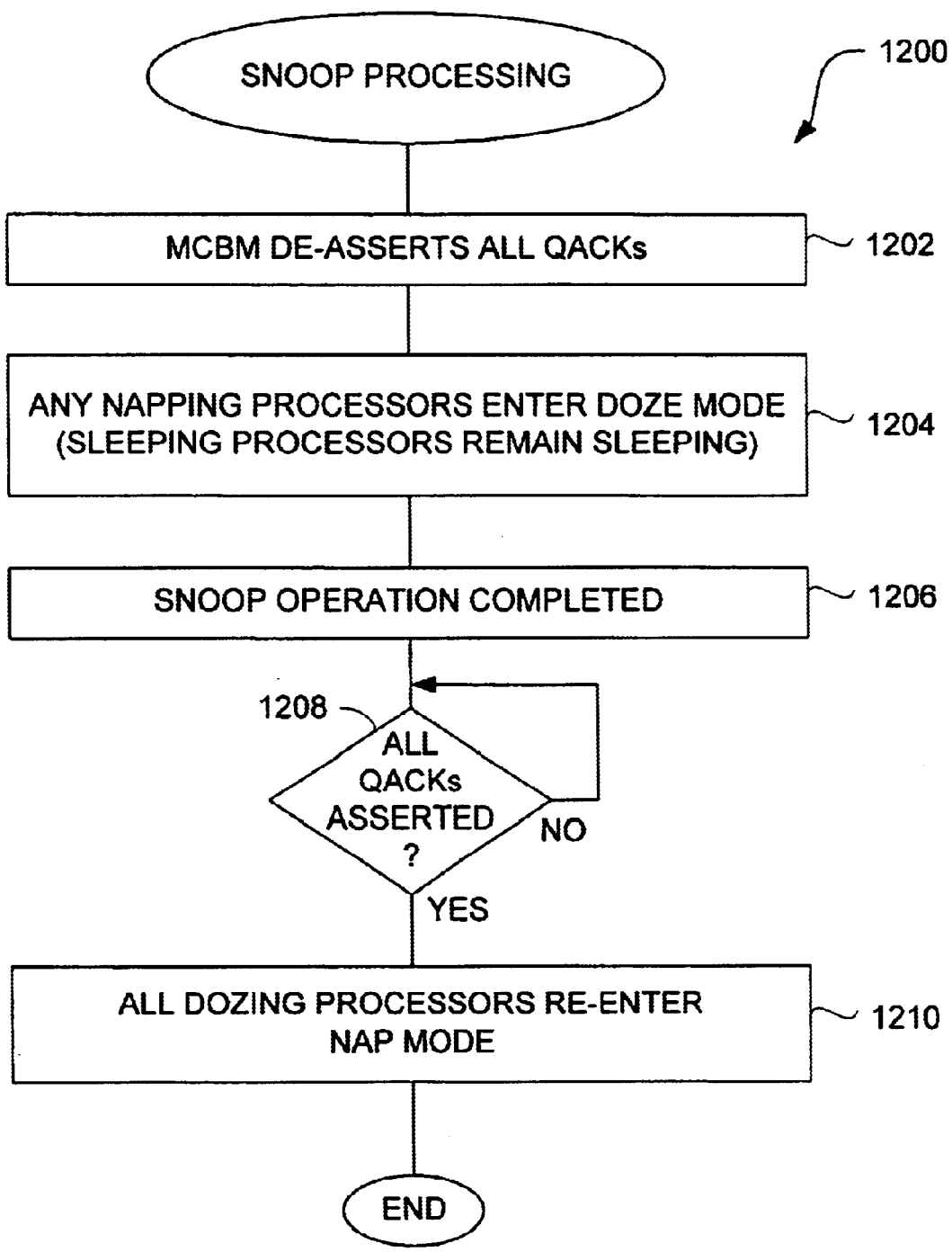
FIG. 12 is a flow diagram of snoop processing according to one embodiment of the invention.

FIG. 12 is a flow diagram of snoop processing 1200 according to one embodiment of the invention. The snoop processing 1200 is associated with the snoop processing 232 for the nap multiple state 207 and the snoop processing 234 for the nap single state 208 illustrated in FIG. 2. In particular, in certain processors, such as used in the described embodiment, their individual modes of operation include a run mode, a nap mode, a doze mode and sleep mode. However, snoop operations can occur in the run mode and the doze mode, but not in the nap mode or the sleep mode. Hence, the snoop processing 1200 operates during the nap single state 208 to temporarily return a particular processor to the doze mode so that the snoop operations can be performed and then return the particular processor to the nap mode once the snoop operations have been completed. Similarly, during the nap multiple state 207, all the processors temporarily return to the doze mode so that the snoop operations can be performed and then return to the nap mode once the snoop operations have been completed.

The snoop processing 1200 begins when there is a need to perform one or more snoop operations. When the snoop processing 1200 is invoked, the memory controller/bus manager de-asserts 1202 all the quiescent acknowledgements (QACKs). At this point, any napping processors enter 1204 the doze mode. The snoop operations can then be completed 1206 by the processors in the doze mode. After the one or more pending snoop operations have been completed, the snoop processing 1200 determines 1208 whether all of the quiescent acknowledgements (QACKs) have been asserted. Here, the memory controller/bus manager will re-assert the quiescent acknowledgements (QACKS) after all of the snoop transactions are complete. Thereafter, any processors in the doze mode re-enter 1210 the nap mode. When the dozing processors go to the nap mode, the computer system returns to its former state (e.g., the nap single state 208 or the nap multiple state 207) and the snoop processing 1200 is complete and ends.

Figure 13A:
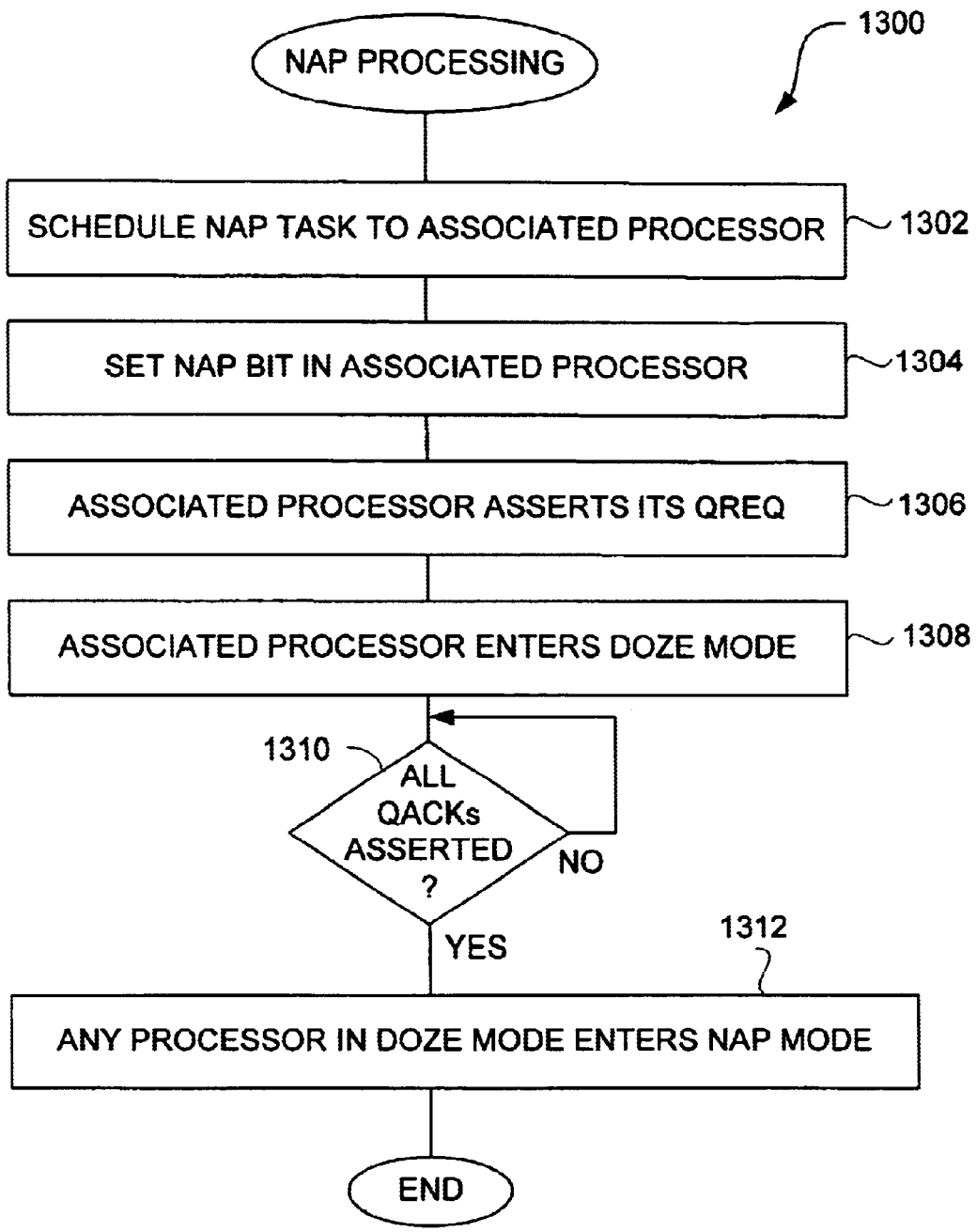
FIG. 13A illustrates a flow diagram of nap processing according to one embodiment of the invention.

As previously noted, each of the processors can operate in a run mode, a doze mode, a nap mode and a sleep mode. FIG. 13A illustrates a flow diagram of nap processing 1300 according to one embodiment of the invention. The nap processing 1300 is, for example, performed during the nap processing 228 when transitioning from the run multiple state 206 to the nap multiple state 207 illustrated in FIG. 2.

The nap processing 1300 is invoked for a given processor whenever an idle task is scheduled to that processor during the run multiple state 206. The idle task is scheduled to a processor when there is no useful work for the processor to perform. For example, when all software processes available to a given processor are blocked, the idle task is scheduled to that processor. The idle task schedules (sets) 1304 the nap bit in the associated processor. The associated processor then asserts 1306 its quiescent request (QREQ). The associated processor then enters 1308 the doze mode. The nap processing 1300 then determines 1310 whether the quiescent acknowledgements (QACKS) have been asserted. Once it is determined 1310 that all the quiescent acknowledgements (QACKs) have been asserted, the processors in the doze mode enter 1312 the nap mode. Here, the associated processor would enter the nap mode at this point. As such, the computer system transitions from the run multiple state 206 to the nap multiple state 207 which offers lower power consumption. After the processors in the doze mode enter 1312 the nap mode, the nap processing 1300 is complete and ends.

Figure 13B:
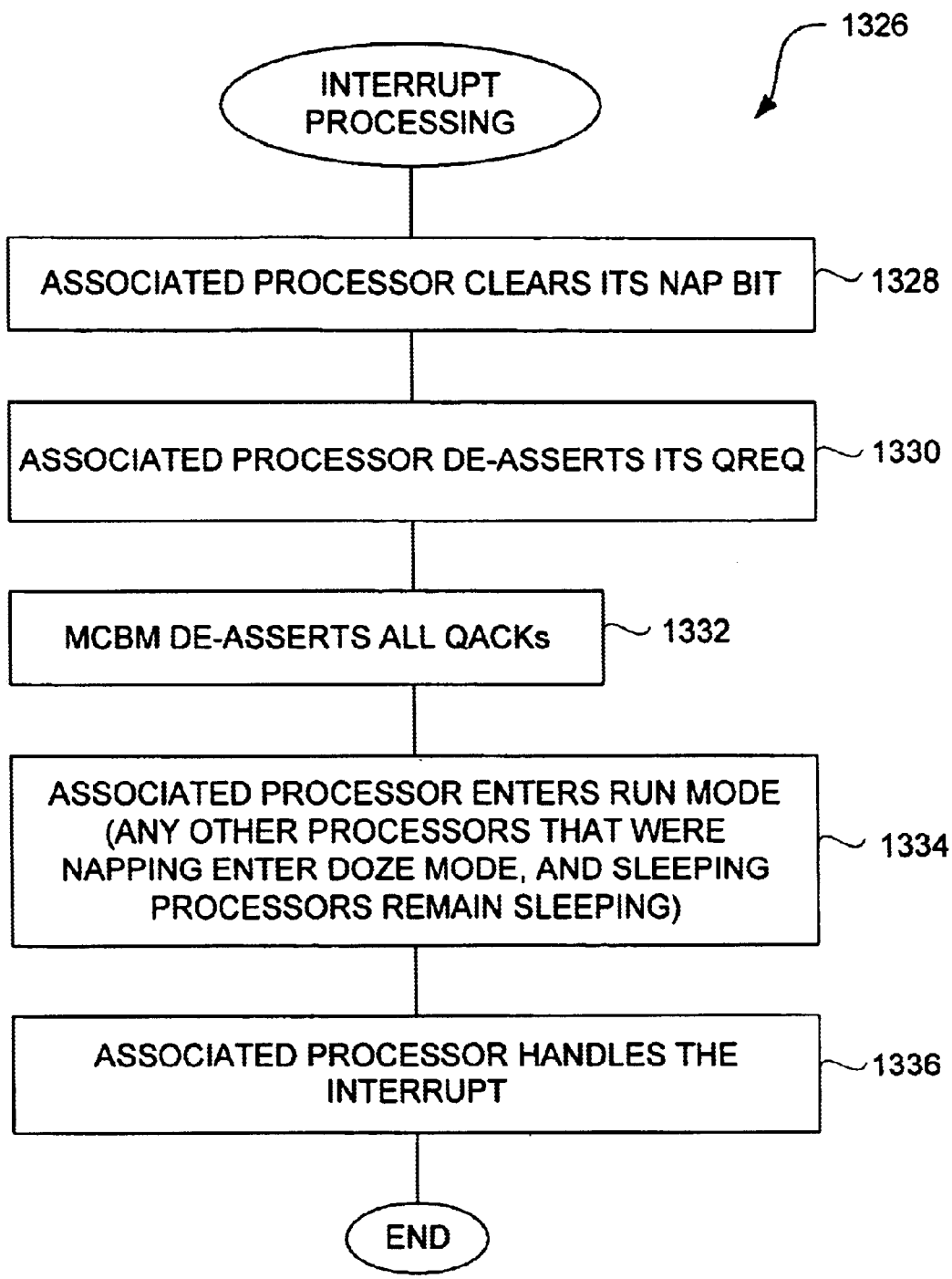
FIG. 13B illustrates a flow diagram of interrupt processing according to one embodiment of the invention.

FIG. 13B illustrates a flow diagram of interrupt processing 1326 according to one embodiment of the invention. The interrupt processing 1326 is, for example, performed during the interrupt processing 230 when transitioning from the nap multiple state 207 to the run multiple state 206 illustrated in FIG. 2. In the case of the nap multiple state 207, one or more of the processors are in the nap mode, whereas in the run multiple state one or more of the processors are in the run mode. In order to process an interrupt a processor needs to be in the run mode, so the following processing explains how the processors needing to handle interrupts enter the run mode from the nap mode.

The interrupt processing 1326 initially clears 1328 the nap bit in the associated processor. The associated processor is the processor receiving the interrupt that needs to be processed. Then, the associated processor de-asserts 1330 its quiescent request (QREQ). Once the associated processor de-asserts 1330 its quiescent request (QREQ), the memory controller/bus manager de-asserts 1332 all the quiescent acknowledgements (QACKs). At this point, the associated processor enters 1334 the run mode. Although the associated processor has entered the run mode, any of the other processors that were in the nap mode enter the doze mode. Thereafter, the associated processor handles 1336 the interrupt. After the interrupt is handled 1336, the interrupt processing 1326 is complete and ends. If the workload on the associated processor is subsequently determined to be low, the nap processing 1300 can thereafter be performed to transition the associated processor back to the nap mode and the nap multiple state 207.

As noted above the controllers used in the computer system can also have sleep or idle modes that offer power savings. These sleep or idle modes can be entered by the controller performing an internal sequence of operations to effect the mode change. The particular operations performed by the controller are dependent on the particular type of controller or manager that performs the shutdown sequence.

Figure 14A:
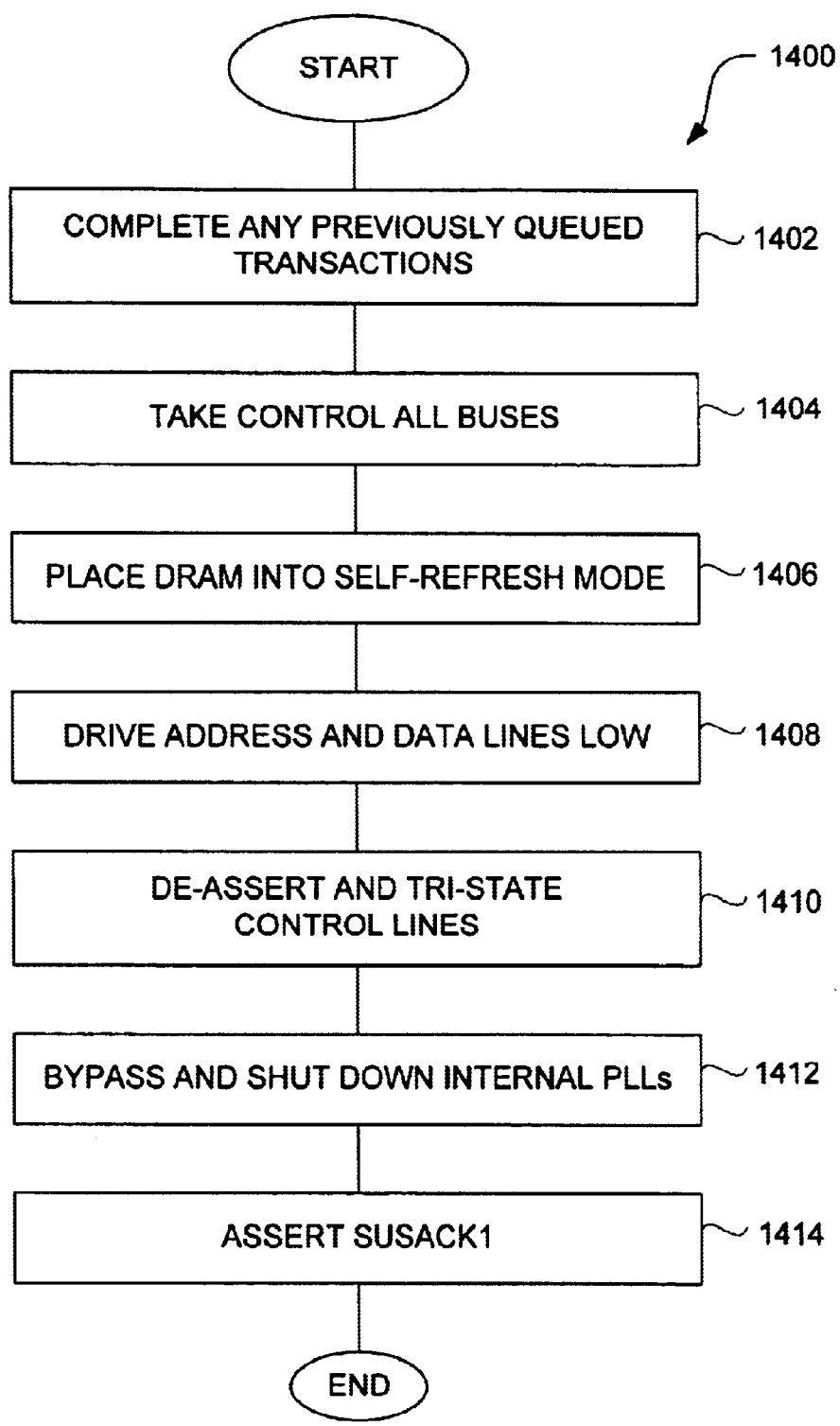
FIG. 14A is a flow diagram of memory controller/bus manager (MCBM) sleep shutdown processing according to one embodiment of the invention.

FIG. 14A is a flow diagram of sleep shutdown processing 1400 according to one embodiment of the invention. The sleep shutdown processing 1400 is, for example, suitable for use as the internal shutdown sequence performed by the memory controller/bus manager. The sleep shutdown processing 1400 is activated when the memory controller/bus manager receives the suspend request SUSREQ1 from the power manager, all of the quiescent request QREQs are received from the processors, and the sleep bit has been previously set in the memory controller/bus manager.

Once invoked, any previously queued transactions to be processed by the memory controller/bus manager are initially completed 1402. Next, the memory controller/bus manager takes 1404 control of the bus. Here, the memory controller/bus manager becomes the bus master and prevents any external grants of the bus. Then, the DRAM (i.e., SDRAM) is placed 1406 in a self-refresh mode. The memory controller/bus manager also drives 1408 address and data lines for the bus low. The control lines for the bus are then de-asserted 1410. Also, in some embodiments, for those of the control lines that are driven high in their de-asserted state, the memory controller/bus manager can tri-state such control lines so that these lines can be held high by pull-up resistors connected to the power of the peripheral devices. Additionally, the memory controller/bus manager can ignore any external bus control signals at this point as such control signals may result from transitions when power is switched on or off to the peripheral devices and the pull-up resistors. Next, the memory controller/bus manager bypasses and shuts down an internal phase-lock loops (PLL) at 1412. Instead of using the internal PLL, the memory controller/bus manager uses an external clock with a lower frequency. Thereafter, the memory controller/bus manager asserts 1414 the suspend acknowledgment SUSACK1. After the suspend acknowledgment SUSACK1 has been asserted 1414, the sleep shutdown processing 1400 is complete and ends.

Also, as noted above, the controllers used in the computer system can also have wakeup sequences that return the controllers from sleep or idle modes to active modes. The particular operations performed by the controller are dependent on the particular type of controller or manager that performs the wakeup sequence.

Figure 14B:
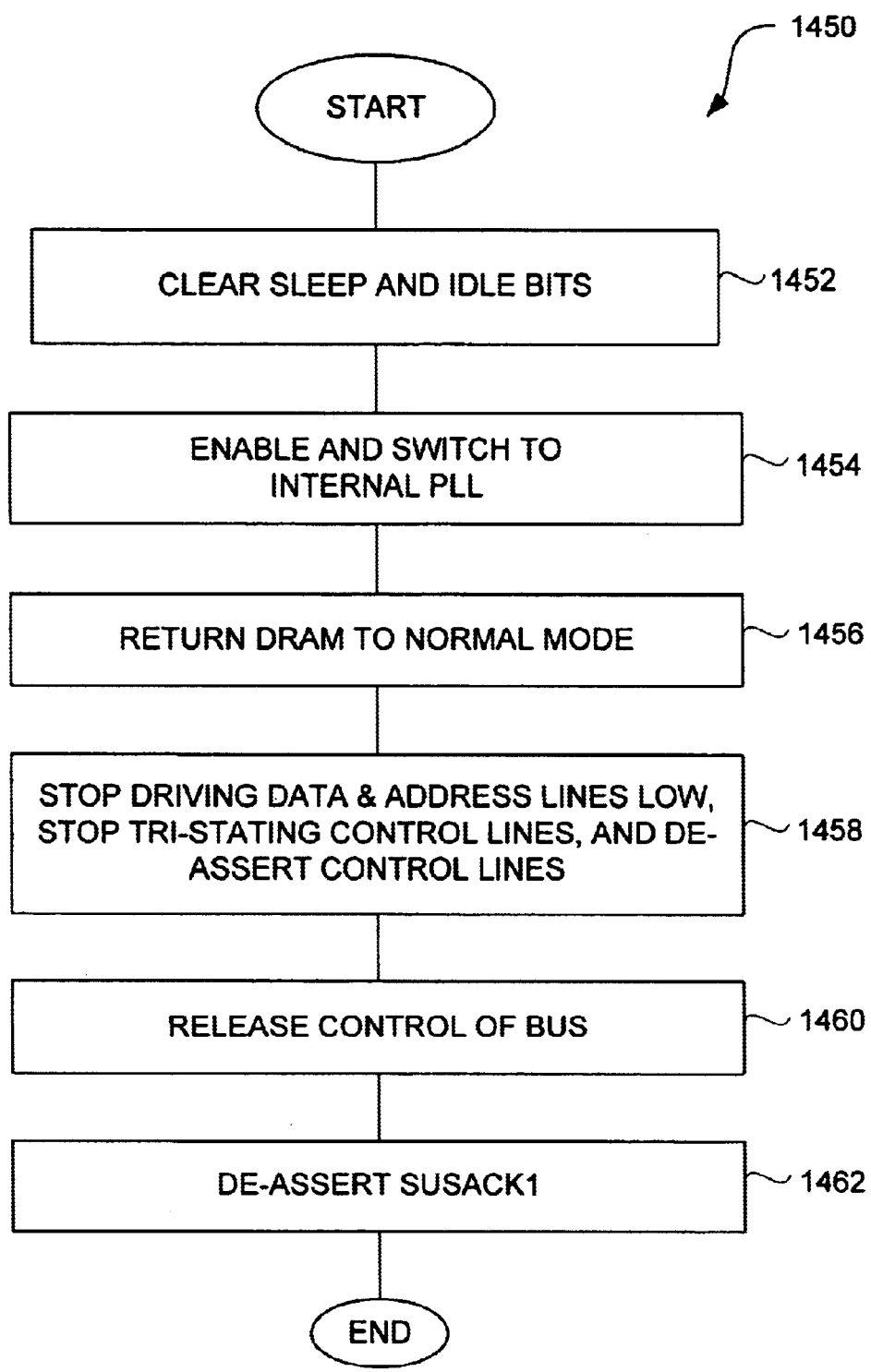
FIG. 14B is a flow diagram of MCBM sleep wakeup processing according to one embodiment of the invention.

FIG. 14B is a flow diagram of sleep wakeup processing 1450 according to one embodiment of the invention. The sleep wakeup processing 1450 is, for example, the internal wakeup sequence performed by the memory controller/bus manager. The sleep wakeup processing 1450 begins at the memory controller/bus manager when the suspend request (SUSREQ1) from the power manager is de-asserted. When the sleep wakeup processing 1450 begins, the memory controller/bus manager is currently in the sleep mode because the sleep shutdown processing 1400 has already been performed. In any case, when the sleep shutdown processing 1450 begins, the sleep and idle bits are cleared 1452. Then, the memory controller/bus manager enables the internal PLL and then switches to utilize the internal PLL (instead of the external clock) after an appropriate amount of time to enable the internal PLL to lock its frequency. Next, the DRAM is returned 1456 to its normal mode (i.e., removed from the self-refresh mode). Then, data and address lines are released (no longer driven low), and the control lines for the bus are driven (no longer tri-stated) and de-asserted 1458. Next, the control of the bus by the memory controller/bus manager is released 1460 so that the memory controller/bus manager can accept bus requests from external devices.

Next, the suspend acknowledgment SUSACK1 is de-asserted 1462 to indicate to the power manager that the sleep wakeup processing 1450 is complete and ends. Note, if instead the power-on clear (POC) was asserted by the power manager to the memory controller/bus manager, the power manager is able to reset the memory controller portion of the memory controller/bus manager after power to the DRAM has been turned off. The separate resets allow the computer system to preserve the contents of memory through an ordinary reset when power to the DRAM has been maintained.

The invention can also be embodied as computer readable code on a computer readable medium. The computer readable medium is any data storage device that can store data which can be thereafter be read by a computer system. Examples of the computer readable medium include read-only memory, random access memory, CD-ROMs, magnetic tape, optical data storage devices. The computer readable medium can also be distributed over a network coupled computer systems so that the computer readable code is stored and executed in a distributed fashion.

The advantages of the invention are numerous. Different embodiments or implementations may have one or more of the following advantages. One advantage of the invention is that it offers improved power management obtained by a layered approach. Another advantage of the invention is that the system power management provided by the invention includes power management (i.e., shutdown) for not only processors but also related control circuitry (e.g., bus controllers, I/O controllers, memory controllers, interrupt controllers). Still another advantage of the invention is that deterministic control over power management of control circuitry provides proper sequencing of shutdown operations. Yet another advantage of the invention is that more aggressive power management of a computer system is provided, whether for a single processor or a multi-processor system.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. In a computer system having a plurality of processors, a bus controller and a power manager, a method for providing deterministic state changes, said method comprising:
   (a) determining when a lower power state of the multi-processor computer system should be entered to reduce power consumption; and
   (b) entering the lower power state by performing the following operations:
      (b1) receiving, at the bus controller, a state change request from the power manager;
      (b2) initiating a state change sequence at the bus controller upon receiving the state change request; and
      (b3) notifying the power manager when the bus controller has completed the state change sequence.

2. A method as recited in claim 1, wherein the computer system is a multiprocessor computer system.

3. A method as recited in claim 1, wherein said entering (b) of the lower power state also performs the operation of:
   (b4) setting a state change bit in the bus controller prior to said receiving (b1).

4. A method as recited in claim 1, wherein the state change sequence is a shutdown sequence performed at the bus controller, such that the bus controller thereafter has reduced power consumption.

5. A method as recited in claim 1,
   wherein said entering (b) of the lower power state also performs the operation of:
      (b5) stopping clocks to at least one of the processors following said notifying, and wherein the lower power state is entered following said stopping (b5).

6. A method as recited in claim 1, wherein said entering (b) of the lower power state also performs the operations of:
   (b5) setting a mode change bit in at least one of the processors to initiate a change its mode;
   (b6) receiving, at the bus controller, a mode change request from at least one of the processors to the bus controller in accordance with the mode change bit;
   (b7) receiving, at the at least one of the processors, an acknowledgement from the bus controller to the mode change request after the bus is prepared to permit the mode change; and
   (b8) changing the mode of the at least one of the processors in accordance with the mode change bit after the acknowledgement to the mode change request has been received.

7. A method as recited in claim 6, wherein said operations (b5)–(b8) are performed at least partially concurrent with the mode change sequence and before said notifying (b4).

8. A method as recited in claim 7, wherein the mode change sequence is a shutdown sequence performed at the bus controller, such that the bus controller thereafter has reduced power consumption.

9. A method as recited in claim 7,
   wherein the multi-processor computer system further includes an interrupt controller, and
   wherein said method further comprises the operations of:
      (b9) receiving, at the interrupt controller, a state change request from the power manager;
      (b10) initiating a state change sequence at the interrupt controller upon receiving the state change request; and
      (b11) notifying the power manager when the interrupt controller has completed the state change sequence.

10. A method as recited in claim 9,
    wherein said entering (b) of the lower power state also performs the operation of:
       (b12) stopping clocks to at least one of the processors following said notifying (b4) and (b11), and
       wherein the lower power state is entered following said stopping (b12).

11. A method as recited in claim 10, wherein the state change sequence at the bus controller is a shutdown sequence performed at the bus controller, such that the bus controller thereafter has reduced power consumption, and wherein the state change sequence at the interrupt controller is a shutdown sequence performed at the interrupt controller, such that the interrupt controller thereafter redirects interrupts to the power manager.

12. A computer system, said computer system comprises:
    at least one processor, said processor executes operations in accordance with a processor clock;
    a bus controller operatively connected to said processor, said bus controller controls bus activity on a bus; and
    a power manager operatively connected to said processor and said bus controller, said power manager controls the processor clock and shutdown of said bus controller, and said power manager provides a first handshaking between said power manager and said bus controller to provide deterministic mode changes for said computer system so as to manage power consumption.

13. A computer system as recited in claim 12,
    wherein said computer system further comprises:
       an I/O controller operatively connected to said processor and said power manager,
    wherein said power manager provides a second handshaking between said power manager and said I/O controller, and
    wherein said power manager considers both the first handshaking and the second shaking in providing deterministic mode changes for said computer system so as to manage power consumption.

14. A computer system as recited in claim 12,
wherein said computer system further comprises:
an interrupt controller operatively connected to said processor and said power manager,
wherein said power manager provides a second handshaking between said power manager and said interrupt controller, and
wherein said power manager considers both the first handshaking and the second shaking in providing deterministic mode changes for said computer system so as to manage power consumption.

15. A computer system as recited in claim 12, wherein said computer system comprises a plurality of processors, said processors execute operations in accordance with processor clocks,
wherein said bus controller and said power manager are operatively connected to said processors, and
wherein said power manager controls the processor clocks.

16. A computer system as recited in claim 15, wherein each of said processors has a run mode and a plurality of low power modes.

17. A computer system as recited in claim 12, wherein said computer system further comprises:
computer program code for determining when a lower power mode of said computer system should be entered to reduce power consumption.

18. A computer system as recited in claim 17, wherein said power manager controls the entry into the lower power mode by sending a mode change request to said bus controller, then awaiting a notification from said bus controller to said power manager when said bus controller has completed a mode change sequence in response to the mode change request, and then completing the entry into the low power mode.

* * * * *